(12) United States Patent
Wisniewski

(10) Patent No.: US 6,431,376 B1
(45) Date of Patent: Aug. 13, 2002

(54) STORAGE BIN ASSEMBLY HAVING UNITARY SIDE AND BACKWALL SUPPORTS

(75) Inventor: Joseph J. Wisniewski, South Plainfield, NJ (US)

(73) Assignee: White Systems, Inc., Kenilworth, NJ (US)

( * ) Notice: Subject to any disclaimer, the term of this patent is extended or adjusted under 35 U.S.C. 154(b) by 0 days.

(21) Appl. No.: 09/590,615

(22) Filed: Jun. 8, 2000

(51) Int. Cl.⁷ .................................................. A47F 5/02
(52) U.S. Cl. ...................................... 211/122; 211/187
(58) Field of Search ................................ 211/122, 186, 211/187; 312/198, 199, 200, 201, 266

(56) References Cited

U.S. PATENT DOCUMENTS

| | | | |
|---|---|---|---|
| 3,368,688 A | 2/1968 | Weiss et al. | 211/1.5 |
| 4,062,302 A | 12/1977 | Krizan | 108/60 |
| 4,138,015 A | 2/1979 | Rabley | 206/561 |
| 4,422,554 A | 12/1983 | Lichti | 211/1.5 |
| 4,463,684 A * | 8/1984 | Klungle et al. | 211/126 X |
| 5,065,872 A | 11/1991 | Simon | 211/122 |
| 5,072,839 A | 12/1991 | Arnone | 211/187 |
| 5,188,245 A | 2/1993 | Mabrey | 211/122 |
| 5,207,335 A | 5/1993 | Voelz | 211/122 |
| 5,607,275 A * | 3/1997 | Woodruff et al. | 414/331 |
| 5,634,760 A | 6/1997 | Anderson et al. | 414/268 |
| 5,645,332 A * | 7/1997 | Snoke et al. | 312/257.1 |
| 6,216,874 B1 * | 4/2001 | Bores et al. | 211/41.18 X |

* cited by examiner

Primary Examiner—Daniel P. Stodola
Assistant Examiner—Erica B. Harris
(74) Attorney, Agent, or Firm—Lerner, David, Littenberg, Krumholz & Mentlik, LLP

(57) ABSTRACT

A storage bin assembly has a first sidewall, a second sidewall and a backwall. The assembly includes a first substantially L-shaped support member including the first sidewall and a first portion of the backwall, the first backwall portion being integrally connected to the first sidewall. The assembly also includes a second substantially L-shaped support member including the second sidewall and a second portion of the backwall, the second backwall portion being integrally connected to the second sidewall. The assembly has a plurality of shelves secured to the first and second support members, the shelves extending from the backwall and between the first and second sidewalls.

36 Claims, 22 Drawing Sheets

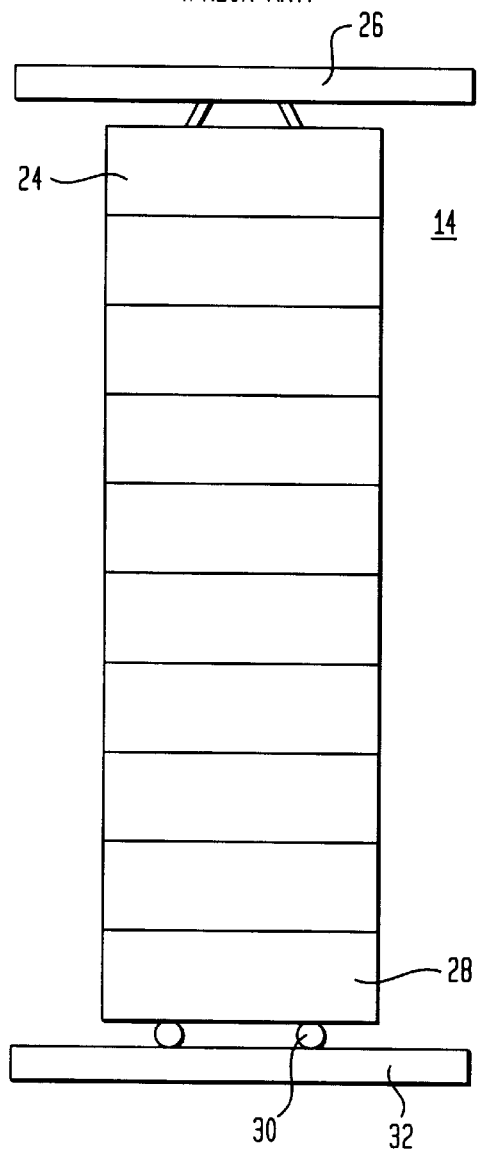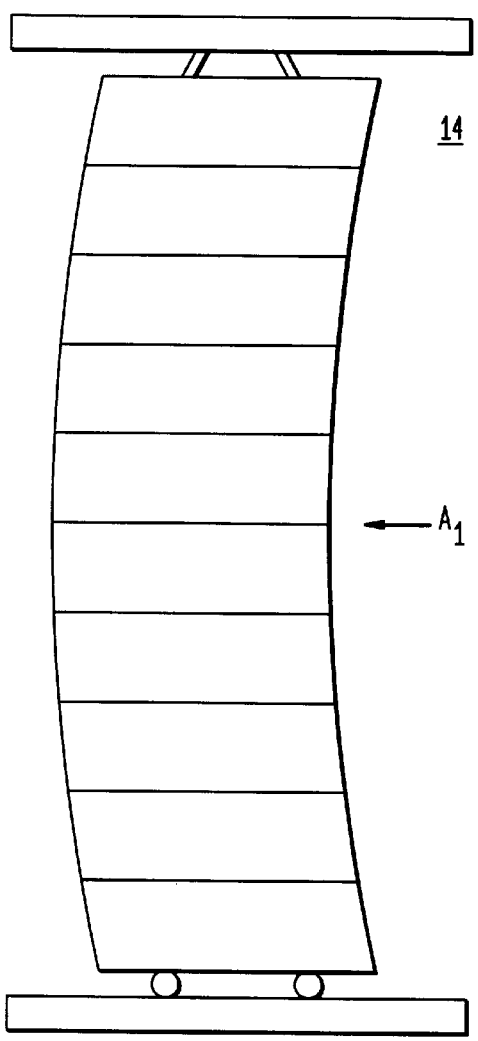
FIG. 2A (PRIOR ART)
FIG. 2B (PRIOR ART)

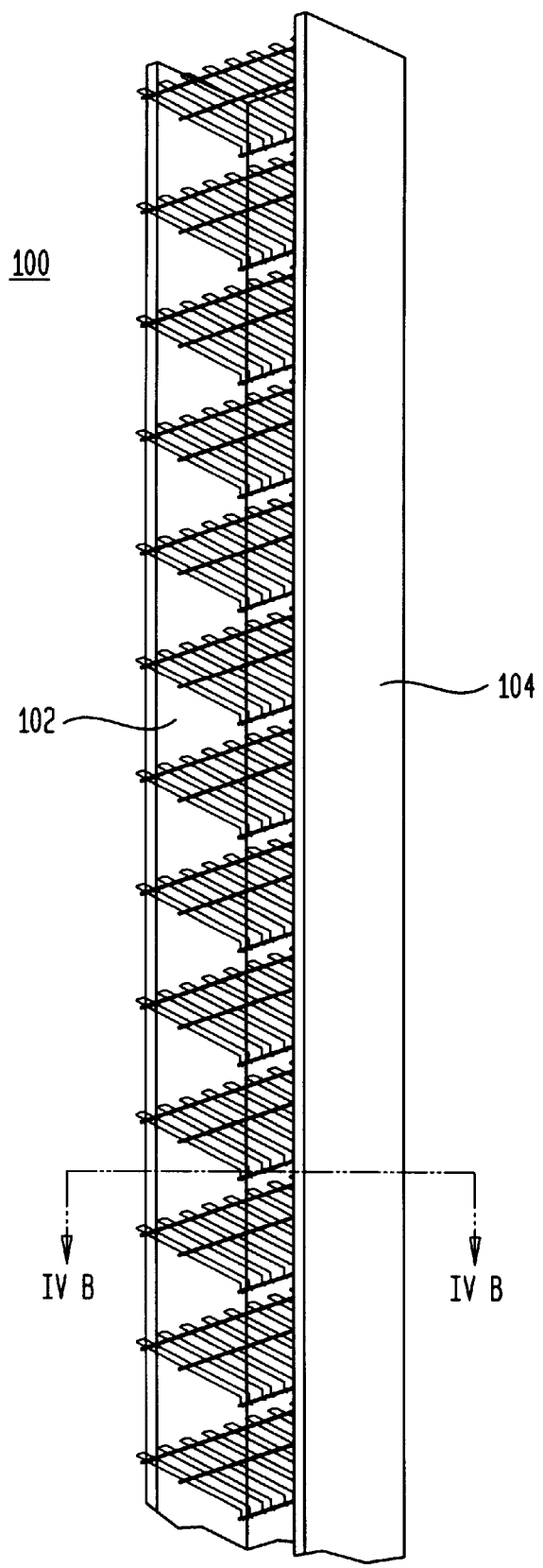

STORAGE BIN ASSEMBLY HAVING UNITARY SIDE AND BACKWALL SUPPORTS

Background of the Invention

1. Field of the Invention

The present invention generally relates to storage systems and more particularly relates to carousel-type storage systems having movable storage bins attached to a frame or track.

2. Brief Description of the Prior Art

Various industries have dedicated considerable time, effort and money to develop large capacity retrieval systems. These storage systems typically comprise a group of movable storage bins that are coupled to a stationary frame. The bins may have an overall height of approximately 30–40 feet. These storage systems are designed to conserve valuable space in a warehouse or factory and facilitate increased productivity since the stored articles can be positioned closer to operators.

One such storage system is disclosed in U.S. Pat. No. 3,368,688, which provides for the storage, transportation and retrieval of documents, file folders and the like. The system includes a plurality of movable storage racks that are coupled to an oblong track, the storage racks being driven on the track by a motor.

In order to increase access to items stored within storage bins, certain preferred embodiments of commonly assigned U.S. Pat. No. 5,207,335 disclose a storage and retrieval system that simultaneously provides access to two side-by-side storage units. Each storage unit has first and second access faces. A first storage portion is accessible from one access face, and a second storage portion is accessible from the opposite access face. A conveyor can be operated so that the first access face of a first bin and the second access face of a second bin confront one another, thereby enabling an operator to simultaneously retrieve articles from both bins.

In certain preferred embodiments of commonly assigned U.S. Pat. No. 5,065,872, the disclosure of which is hereby incorporated by reference herein, a storage, transportation and retrieval system, and accompanying storage racks, are provided for increasing the effective storage capacity of the storage system. The storage system provides for simultaneous access to two adjacent storage racks, thereby requiring less call-ups to locate desired items. The system may be arranged so that it occupies less area.

Referring to FIG. 1, the storage and retrieval carousel 10 of the '872 patent is a bottom drive horizontal carousel including a frame structure 12 and a plurality of storage racks 14 moveably connected to the frame structure 12. Drive mechanism 16 is depicted in a broken away area of FIG. 1, as are rollers 18 and guide track 20. A guide bar 22 facilitates the suspension and/or support of the individual storage racks at the frame structure 12. The storage racks 14 may be box-like members, which are enclosed on their top, bottom, front and rear sides. Several storage compartments are provided on the sides of each storage rack 14, thereby providing access to articles stored therein from either side of the storage rack.

Storage racks such as those described above, typically have a substantial vertical height which can be approximately 10–15 feet or higher. The storage rack 14 shown in FIG. 2A has an upper end 24 coupled to a movable conveyor 26 and a lower end 28 guided along a path by runners 30 coupled with track 32. FIG. 2A shows the storage bin in a stationary position. When an operator moves the conveyor 26 in order to gain access to one of the storage bins, the conveyor accelerates in a first direction indicated by arrow $A_1$, as shown in FIG. 2B. Due to the substantial height of the storage bin, and in response to forces exerted upon the bin during movement, the storage bin may buckle or bow. As a result, the buckling or bowing storage bin may contact adjacent bins. Such contact is highly undesirable and may cause damage to the bins or the conveyor system. In order to combat this problem, systems have been designed that provide extra space between adjacent bins to account for buckling. However, the need to provide for extra space between adjacent bins reduces the overall capacity of the storage system.

FIGS. 3A–3C show another problem encountered when moving storage bins attached to a conveyor system. In FIG. 3A, the storage bin is in a stationary position. In FIG. 3B, the storage bin is being moved in a direction indicated by arrow $A_1$. As the storage bin moves, the upper and lower ends of the bin may twist or turn relative to one another. As shown in FIG. 3C, when the conveyor is later decelerated to stop movement of the bins, the bin may twist or turn in the opposite direction. This torsional movement during start-up and stopping of the carousel may ultimately result in permanent deformation of the bins. Such torsional movement may also result in shifting of the items stored in the bins.

Thus, there is a need for a storage system wherein the respective bins have sufficient structural rigidity so as to prevent buckling and/or torsional movement of the bins during start-up and stopping of the carousel. Such a system will allow the respective bins to be positioned closer together, without worrying about adjacent bins contacting each other. Thus, such a system will enable a maximum number of bins to be coupled to the frame, thereby increasing the overall capacity of the system.

SUMMARY OF THE INVENTION

In accordance with certain preferred embodiments of the present invention, a storage bin assembly attachable to a movable carousel-type frame has first and second sidewalls, a backwall and an opening extending along a front face to thereof. The assembly preferably includes a first substantially L-shaped support member including the first sidewall and a first portion of the backwall. The first backwall portion is preferably integrally connected to the first sidewall to form a substantially L-shaped support member having a unitary structure. The assembly also preferably includes a second substantially L-shaped support member including the second sidewall and a second portion of the backwall. The second backwall portion is also preferably integrally connected to the second sidewall to form a substantially L-shaped support member having a unitary structure. During assembly of the storage bin, the first and second support members are preferably configured so that the first and second sidewalls extend in directions that are substantially parallel to one another and the first and second backwall portions extend toward one another. In other words, the inner surfaces of the first and second sidewalls confront one another. In certain preferred embodiments, the first and second portions of the backwall are spaced apart from one another so as to define a longitudinal gap therebetween. The longitudinal gap preferably extends between upper and lower ends of the support members. In other embodiments, the storage bin may be assembled so that the first and second backwall portions engage one another, or overlap with one another.

Each of the first and second support members preferably has an upper end and a lower end. The assembly preferably includes an upper plate secured to the upper ends of the support members and a lower plate secured to the lower ends of the support members. The upper and lower plates preferably enhance the structural integrity of the assembly. The attachment of the upper and lower plates may provide an assembly that does not buckle, bend or twist, as shown and described above. In still other embodiments, a horizontal plate or bar may extend between the first and second sidewalls, at an intermediate point located between the upper and lower ends of the support members. The horizontal plate or bar may add still further structural rigidity to the storage bin assembly.

The first and second sidewalls desirably include front edges remote from the backwall of the assembly and extending between the upper and lower ends of the respective support members. When the storage bin is fully assembled, the front edges of the first and second sidewalls preferably define a front face of the bin assembly. The front edges of the first and second sidewalls may include guide flanges. The guide flanges preferably project away from the backwall of the assembly. The guide flanges also desirably extend away from one another. The guide flanges preferably extend along the front face of the assemblies, between the upper and lower ends of the first and second support members. The guide flanges are designed to direct an article into a storage slot as the article is being placed in one of the slots. Providing guide flanges along the front face of the storage bin assembly provides a dramatic improvement over prior art storage bins that have blunt front edges. In these prior art systems, the front edges are likely to catch or snag an article as the article is being stored within the storage bin.

The storage bin assembly also preferably includes a plurality of shelves that are attached to the first and second support members. The shelves preferably extend from the backwall of the assembly and between the first and second sidewalls. Each shelf preferably includes a front edge, a rear edge having one or more rear hooks and first and second side edges extending between the front and rear edges. The first and second side edges preferably include one or more side or lateral hooks extending therefrom. In certain preferred embodiments, the first and second backwall portions include a plurality of openings extending therethrough for securing the rear hooks of the shelf therein. In turn, the first and second sidewalls also include a plurality of openings extending therethrough for receiving the side hooks of the shelf. As a result, the shelf may be secured at a location within the assembly by placing the rear and side hooks through the openings in the respective back and sidewalls. In other preferred embodiments, the shelves may comprise sheet metal that may be bolted in place.

In certain preferred embodiments, the shelves include first support rods that extend in directions substantially parallel to the front and rear edges of the shelf. The opposite ends of at least one of the first support rods include the side hooks described above. The shelf also preferably includes second support rods extending in directions substantially perpendicular to the first support rods. As mentioned above, the rearward ends of the second support rods preferably have rear hooks. The forward end of each second support rods is preferably integrally connected to an adjacent second support rod. The forward ends of the adjacent, integrally connected, second support rods are preferably connected by a U-shaped or loop-like structure.

The first and second substantially L-shaped support members are preferably made using a metal blank, such as a sheet metal blank. A plurality of openings adapted to receive the rear and side hooks of the shelves are then punched through the metal blank. A crease may then be formed in the metal blank, the crease defining the sidewall and backwall portion of each L-shaped support member. The forward edge of each sidewall is then bent outwardly to form the outwardly extending guide flange. The outwardly extending guide flange serves two functions. The first function is to improve the structural rigidity of the forward edge of the sidewall. The second function is to provide a guide for articles being stored within one of the storage slots of the storage bin assembly. The unitary construction of the support members also enhances the structural rigidity of the storage bin assembly. Specifically, the crease formed between the sidewalls and the backwall portions improves the rigidity of the overall assembly, thereby minimizing the buckling, bending and/or twisting problems described above.

In accordance with further preferred embodiments of the present invention, a storage bin assembly includes first and second sidewalls and a backwall. The assembly includes a first unitary support comprising the first sidewall and a first portion of the backwall, the first backwall portion being integrally connected to the first sidewall. The assembly also includes a second unitary support comprising the second sidewall and a second portion of the backwall, the second backwall portion being integrally connected to the second sidewall. The assembly also includes an upper support plate attached to upper ends of the first and second support members and a lower support plate attached to lower ends of the first and second support members. After assembly, the first and second sidewalls preferably extend in directions that are substantially parallel to one another. The first and second portions of the backwall preferably extend in directions that are substantially perpendicular to the sidewalls. Thus, the first and second supports formed substantially L-shaped structures whereby the shorter leg of the "L" is the backwall portion and the longer leg of the "L" is the sidewall of the support member. In certain preferred embodiments, the storage bin assembly desirably includes a plurality of shelves attached to the first and second support members. The shelves are preferably in substantial vertical alignment with one another, each pair of adjacent shelves defining a storage slot adapted to receive one or more articles, such as a box.

In another preferred embodiment of the present invention, a storage bin assembly has first and second sidewalls, a backwall and a front opening remote from the backwall. The assembly preferably includes a first substantially L-shaped support having an upper end and a lower end, the first support including the first sidewall and a first portion of the backwall. The assembly also preferably includes a second substantially L-shaped support having an upper end and a lower end, the second support including the second sidewall and a second portion of the backwall. The first and second sidewalls desirably include front edges remote from the backwall and extending between the upper and lower edges of said support members. The front edges of the first and second sidewalls preferably include outwardly extending flanges that extend away from one another and away from the backwall of the assembly. The outwardly extending flanges desirably improve the tolerance for storing articles within the storage bin. As a result, the outer dimensions of articles being stored in the slots may more closely match the inner dimensions of the bin opening. The storage bin assembly may also include an upper support plate attached to the upper ends of the first and second support members and a lower plate attached to the lower ends of the first and second support members.

In still further preferred embodiments of the present invention, a carousel-type storage system includes a frame for supporting storage bin assemblies, with one or more storage bin assemblies being movably coupled to the frame. Each storage bin assembly that is movably coupled to the frame preferably includes a first substantially L-shaped support member having a first sidewall and a first portion of a backwall, the first backwall portion being integrally connected to the first sidewall. Each storage bin assembly also preferably includes a second substantially L-shaped support member including a second sidewall and a second portion of a backwall, the second backwall portion being integrally connected to the second sidewall. A plurality of shelves are preferably attached to the first and second support members to provide a plurality of storage slots for storing articles within the storage bins attached to the carousel.

These and other preferred embodiments of the present invention will be described in more detail below and in the claims appended hereto.

BRIEF DESCRIPTION OF THE DRAWINGS

FIG. 2A shows a front view of a prior art storage bin assembly.

FIG. 2B shows the prior art storage bin of FIG. 2A during movement of the bin.

FIG. 4A shows a perspective view of a storage bin assembly, in accordance with certain preferred embodiments of the present invention.

DETAILED DESCRIPTION OF PREFERRED EMBODIMENTS

Figure 1:
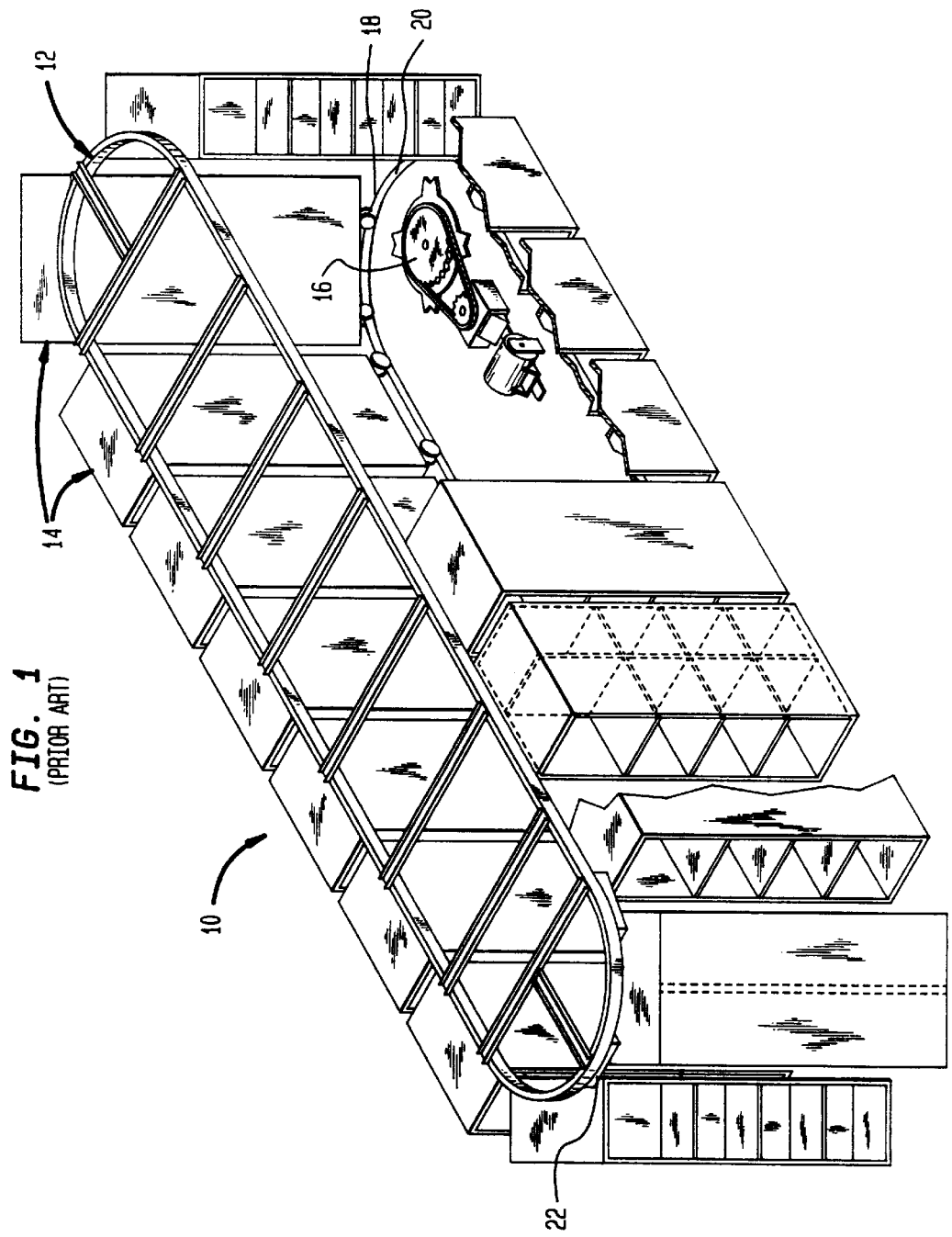
FIG. 1 shows a perspective view of a prior art storage and retrieval system.
Figure 3A:
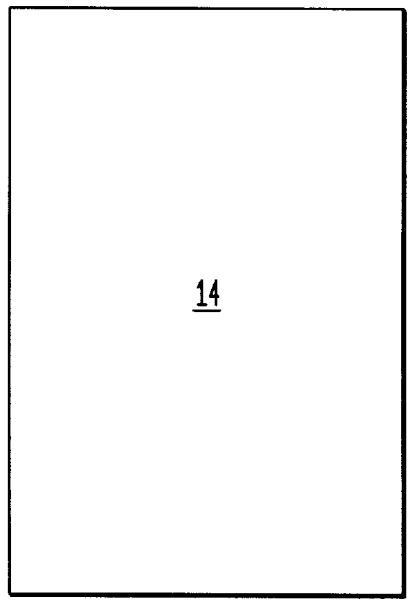
FIGS. 3A–3C show top views of the prior art storage bin of FIG. 2A.
Figure 3B:
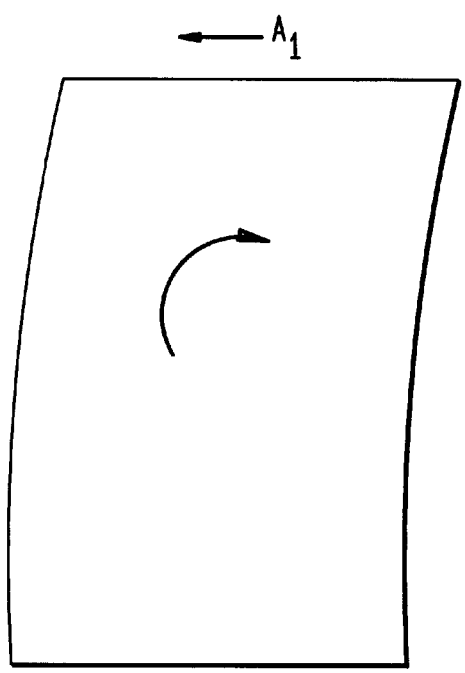
Figure 3C:
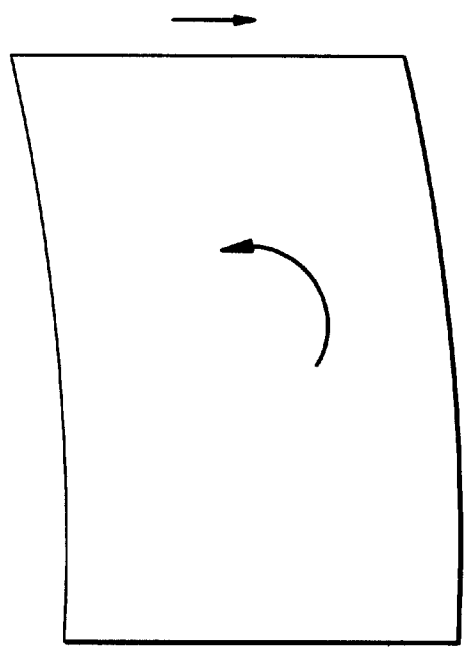
Figure 4B:
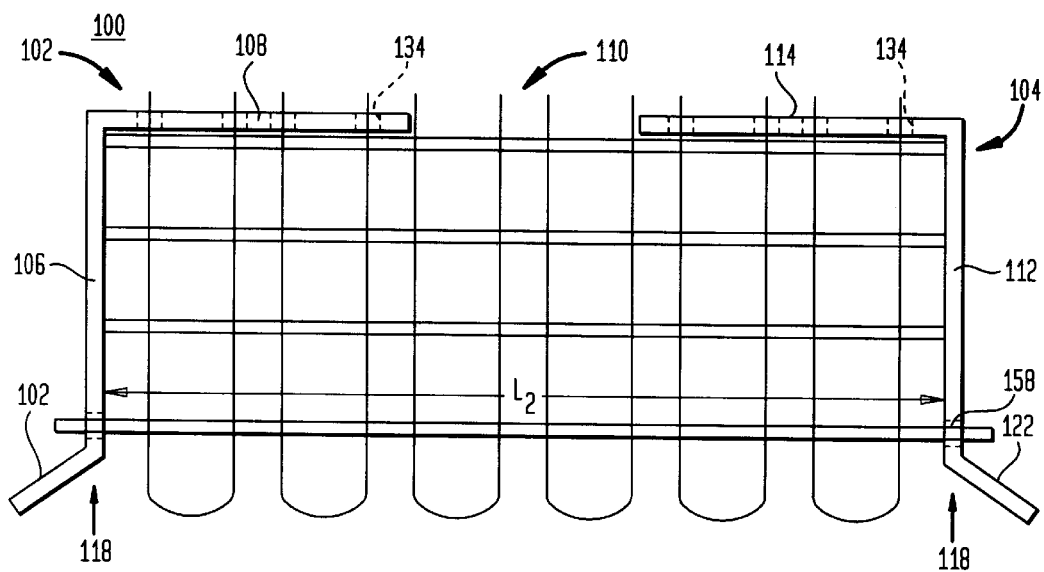
FIG. 4B shows a cross-sectional view of the storage bin assembly of FIG. 4A taken along line IVB—IVB of FIG. 4A.

FIGS. 4A and 4B show a storage bin assembly 100, in accordance with certain preferred embodiments of the present invention. The storage bin 100 includes a first support member 102 and a second support member 104. Each support member forms one of the sidewalls of the bin and a portion of the backwall of the bin. The first and second support members are preferably substantial mirror images of one another.

FIG. 4B shows a fragmentary view of the storage bin assembly shown in FIG. 4A. Storage bin assembly 100 includes a first substantially L-shaped support member 102 including a first sidewall 106 and a first portion 108 of the backwall 110. The first backwall portion 108 is preferably integrally connected to the first sidewall 106. In other words, the first sidewall 106 and the first backwall portion 108 form a unitary piece of the assembly. The storage bin assembly 100 also includes a second substantially L-shaped support member 104 including a second sidewall 112 and a second portion 114 of the backwall 110. The second backwall portion 114 is also integrally connected to the second sidewall portion 112. Thus, the second sidewall 112 and the second backwall portion 114 also form a unitary piece of the assembly. As will be described in more detail below, a plurality of shelves 136 may be attached to the storage assembly 100 to provide an array of substantially vertically aligned storage slots.

Referring to FIG. 4B, each storage bin assembly desirably includes a front face 118 remote from the backwall 110. At the front face 118, first support member 102 includes an outwardly projecting flange 120. Second support member 104 also includes an outwardly projecting flange 122. When the storage bin 100 is fully assembled, the flanges 120, 122 of the respective first and second support members 102, 104 extend away from one another. The flanges 120, 122 provide guide flanges that guide articles into the respective storage slots, as the articles are being stored in the assembly. In certain preferred embodiments, the ends of the first and second backwall portions are spaced apart from one another, thereby providing a longitudinal gap that extends between upper and lower ends of the storage assembly.

Figure 5:
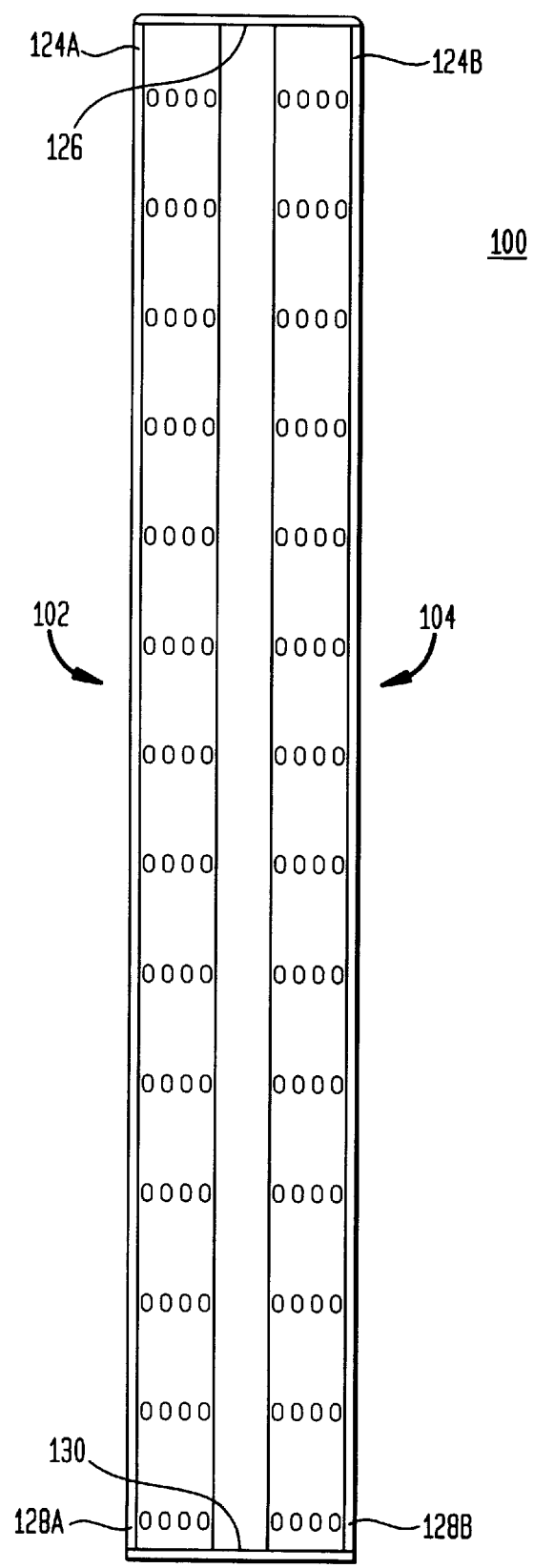
FIG. 5 shows a front elevation view of the storage bin assembly of FIG. 4A, with shelves removed from the assembly.

Referring to FIG. 5, in certain preferred embodiments, first and second support members 102, 104 have upper ends 124A, 124B with an upper plate 126 attached to the upper ends. The first and second support members also have lower ends 128A, 128B with a lower plate 130 attached to the lower ends. The upper and lower plates 126, 130 may be attached by using fasteners, such as screws or bolts. After being attached to the first and second support members, the upper and lower plates preferably enhance the structural integrity of the storage bin assembly, so as to avoid the buckling, bending and twisting problems that typically occur when moving prior art storage bin assemblies.

Figure 6:
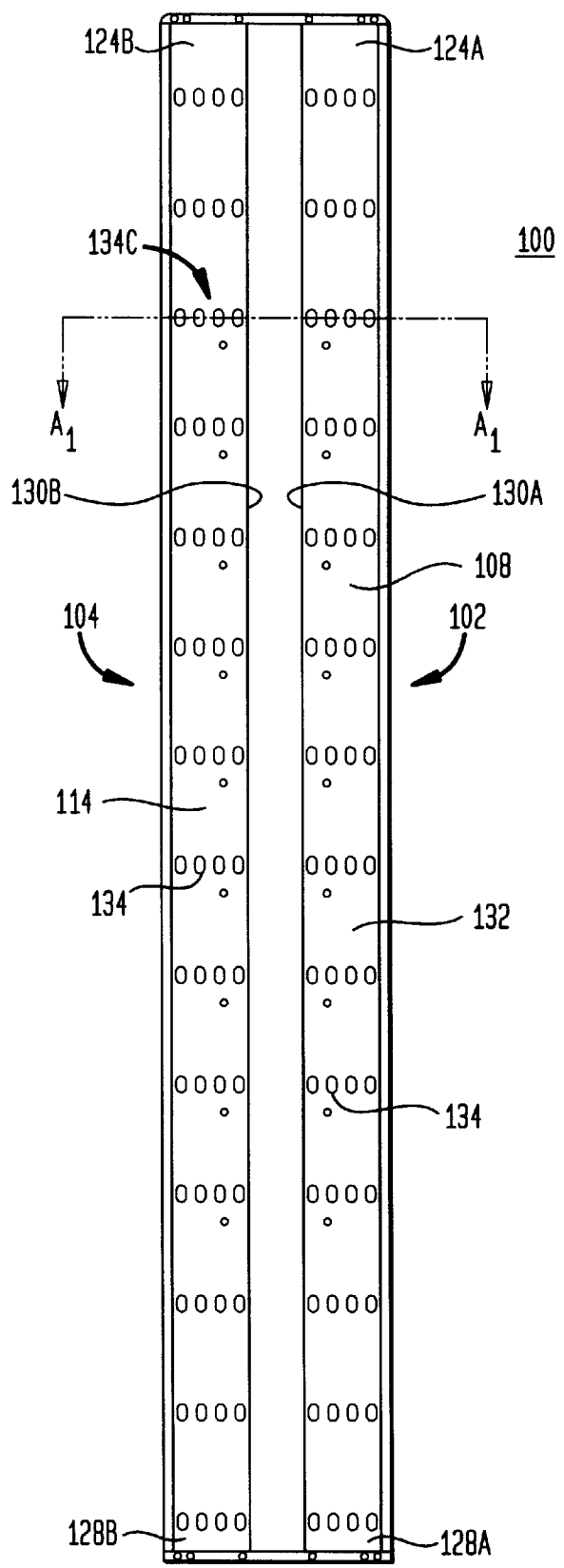
FIG. 6 shows a rear elevation view of the storage bin assembly of FIG. 5.

Referring to FIG. 6, the storage bin assembly includes first and second backwall portions 108, 114. The first and second backwall portions 108, 114 extend between the upper 124A, 124B and lower ends 128A, 128B of the respective first and second support members 102, 104. The confronting edges 130A, 130B of the first and second backwall portions 108, 114 are preferably spaced apart from one another so that a longitudinal gap 132 extends between the first and second backwall portions. The first and second backwall portions may include a series of openings 134 extending therethrough. The openings 134 are adapted to receive hooks projecting from storage shelves that may be secured to the assembly. The openings extending through the respective first and second backwall portions 108, 114 are preferably aligned in rows, each row forming a level for a shelf. For example, the openings in a row designated 134C are aligned along axis $A_1$—$A_1$.

Figure 7A:
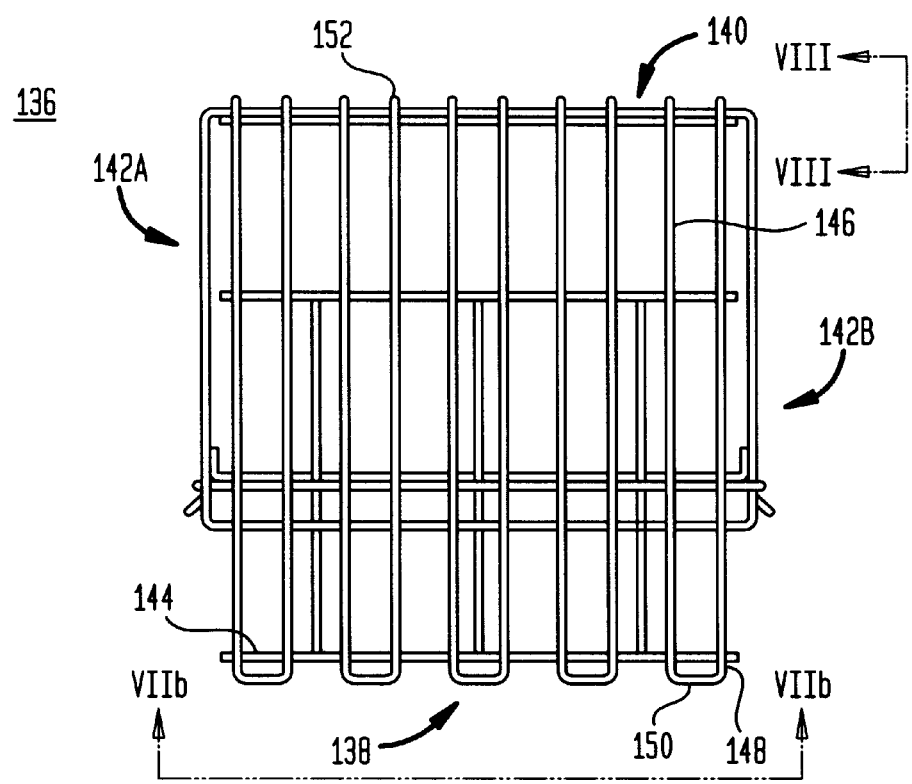
FIG. 7A shows a top view of a storage shelf for the storage bin assembly of FIG. 5, in accordance with certain preferred embodiments of the present invention.

FIG. 7A shows a top view of a shelf 136 for a storage assembly, in accordance with certain preferred embodiments of the present invention. The shelf 136 includes a forward edge 138, a rear edge 140 and two side edges 142A, 142B extending between the forward and rear edges 138, 140. The shelf 136 includes first support rods 144 extending in directions substantially parallel to the forward and rear edges 138, 140 and second support rods 146 extending substantially perpendicular to first support rods 144. Selected portions of the first and second support rods may be attached together (e.g. welded). The forward ends 148 of paired second support rods 146 are connected together via loop section 150. The rear ends of second support rods preferably include rear hooks 152 (FIG. 8) for securing the rear edge 140 of the shelf 136 to the openings 134 in the backwall portions 108, 114 (FIG. 6).

Figure 7B:
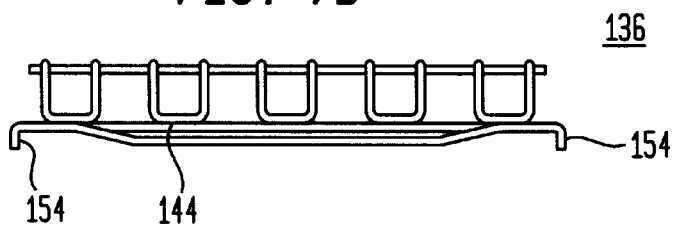
FIG. 7B shows a front elevational view of the storage shelf shown in FIG. 7A, taken along line VIIB—VIIB of FIG. 7A.

FIG. 7B shows a front elevation view of the shelf 136 of FIG. 7A. At least one of the first support rods 144 has side hooks 154 at opposite ends thereof As will be described in more detail below, the side hooks 154 projecting from the sides of the first support rod 144 are preferably adapted for securing the shelf 136 to the first and second support members 102, 104 (FIG. 4B).

Figure 8:
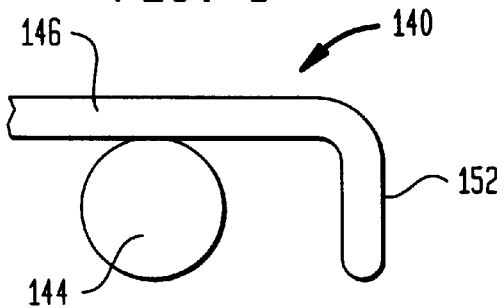
FIG. 8 shows a fragmentary cross-sectional view of FIG. 7A taken along line VIII—VIII of FIG. 7A.

FIG. 8 shows a fragmentary cross-sectional view of the shelf 136 in FIG. 7A, including rear hooks 152 projecting from the rear edge 140 of shelf Each rear hook 152 is adapted for engaging one of the openings 134 in the backwall 110 for securing the shelf to the first and second support members 102, 104.

Figure 9:
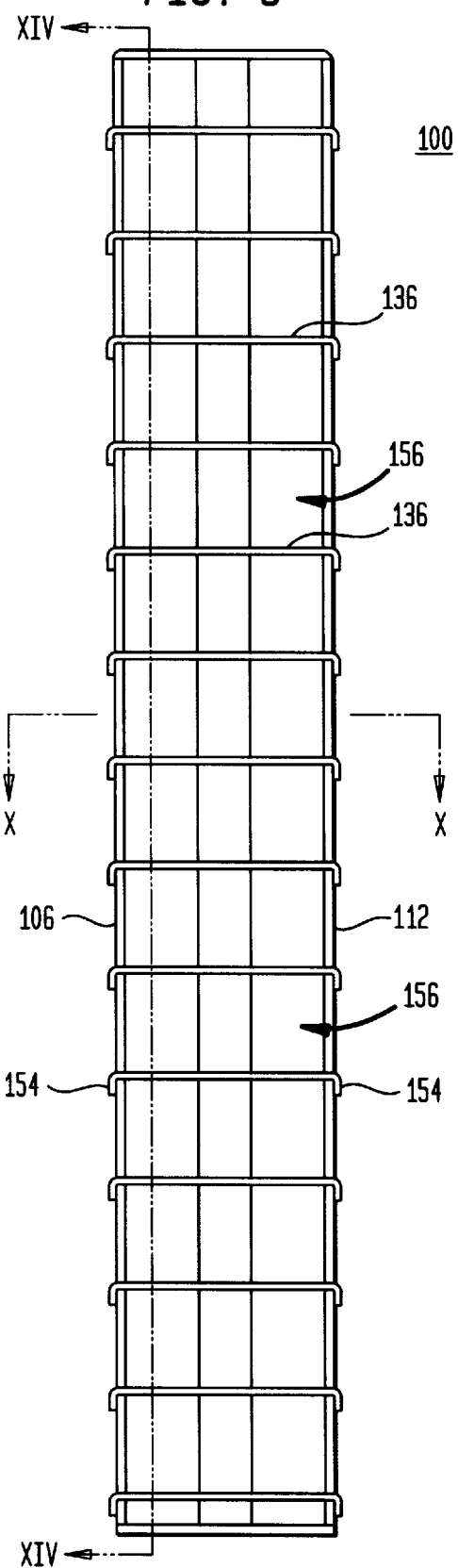
FIG. 9 shows a front elevation view of the storage bin assembly of FIG. 5, with a plurality of the shelves shown in FIG. 7A secured thereto.

FIG. 9 shows the storage bin assembly 100 of FIG. 5 after a plurality of shelves 136, similar to the one shown in FIG. 7A, have been secured thereto. Each shelf 136 forms a respective storage slot 156 for the assembly. An article (not shown), such as a box containing files, may be stored within each storage slot. The side hooks extending from the opposite ends of at least one of the first support rods project through the openings in first and second sidewalls 106, 112 for securing the shelves to the sidewalls.

Figure 10:
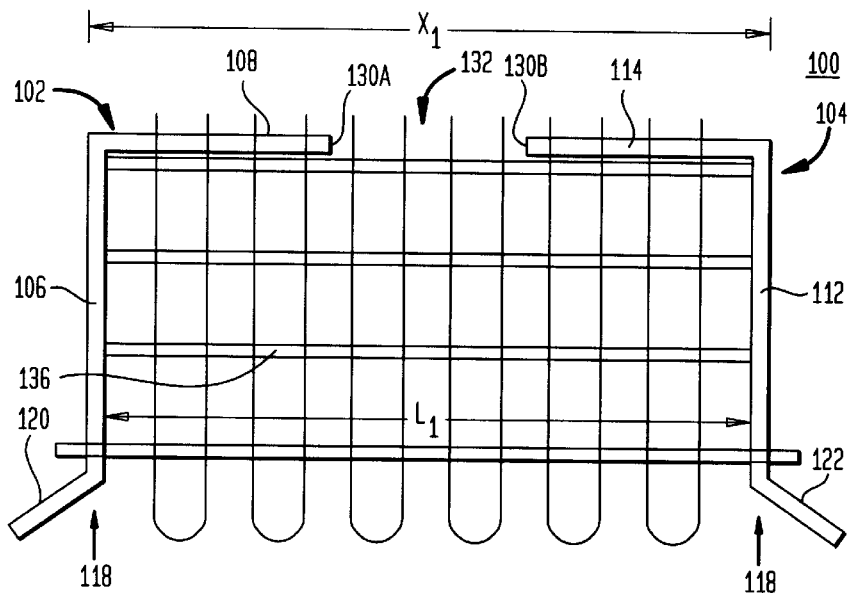
FIG. 10 shows a cross-sectional view of the storage bin assembly of FIG. 9 taken along line X—X of FIG. 9.

FIG. 10 shows a top fragmentary view of the storage bin assembly 100 shown in FIG. 9. The storage bin assembly includes first substantially L-shaped support member 102 and second substantially L-shaped support member 104. The sidewalls 106, 112 of the respective first and second support members 102, 104 preferably extend in directions that are substantially parallel to one another. The first and second backwall portions 108, 114 are integrally connected to the respective sidewalls 106, 112 of the first and second support members. The confronting edges 130A, 130B of the first and second backwall portions 108, 114 are preferably spaced apart from one another so as to provide a gap 132 therebetween. The storage bin assembly also includes a front face 118 with guide flanges 120, 122 projecting outwardly from the front face 118. The guide flanges 120, 122 preferably extend away from one another. Although the present invention is not limited by any particular theory of operation, it is believed that the guide flanges help to guide articles into one of the storage slots as to articles are being stored in the assembly.

Figure 11:
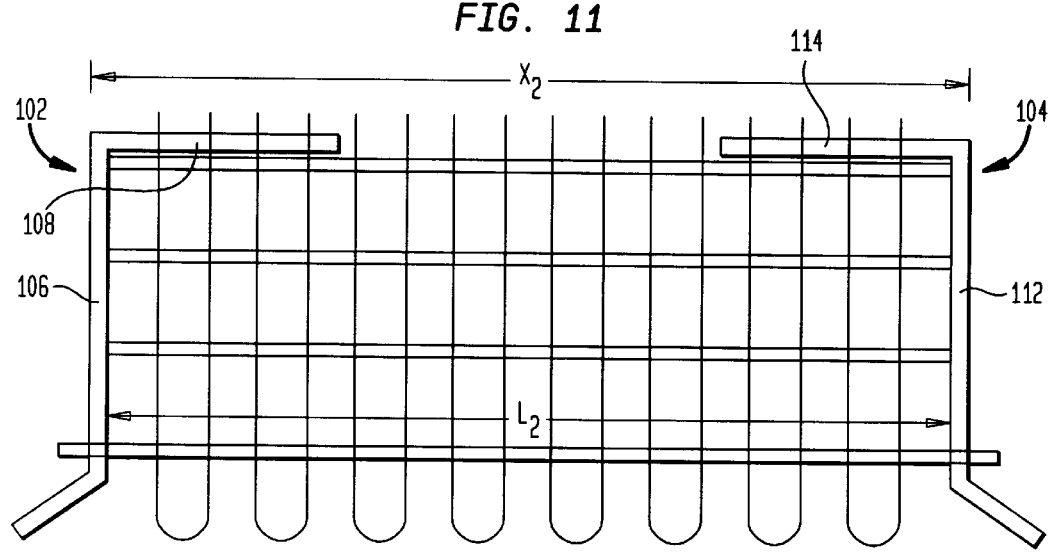
FIG. 11 shows a cross-sectional view of a storage bin assembly, in accordance with further preferred embodiments of the present invention.

The present invention also enables the width of the storage bin assembly to be adjusted. For example, the storage bin assembly 100 of FIG. 10 has a width designated $X_1$, the assembly being adapted to receive a shelf having a first length $L_1$. However, the width of the assembly can be increased by increasing the space between the first and second support members. Referring to FIG. 11, first and second support members 102, 104 are spaced further apart from one another at a distance designated $X_2$ that is greater than the distance $X_1$. Thus, the assembly is capable of receiving a second shelf having a length $L_2$ that is greater than the length $L_1$ of the first shelf of FIG. 10. Although the present invention is not limited by any particular theory of operation, it is believed that integrally connecting the first and second backwall portions 108, 114 with the respective first and second sidewalls 106, 112 enables the overall width of the storage bin assembly to be adjustable. As a result, there is no need to change the dimensions of the first and second supports each time one desires to change the dimensions of the storage assembly. Thus, the dimensions of the storage assembly will generally correspond to the size of the shelves being secured in the assembly. As a result, the storage bin assembly of the present invention is much more versatile than prior art storage bins. The storage bin assembly also requires less parts because the dimensions of the support members will not change, regardless of the width of the assembly.

Figure 12:
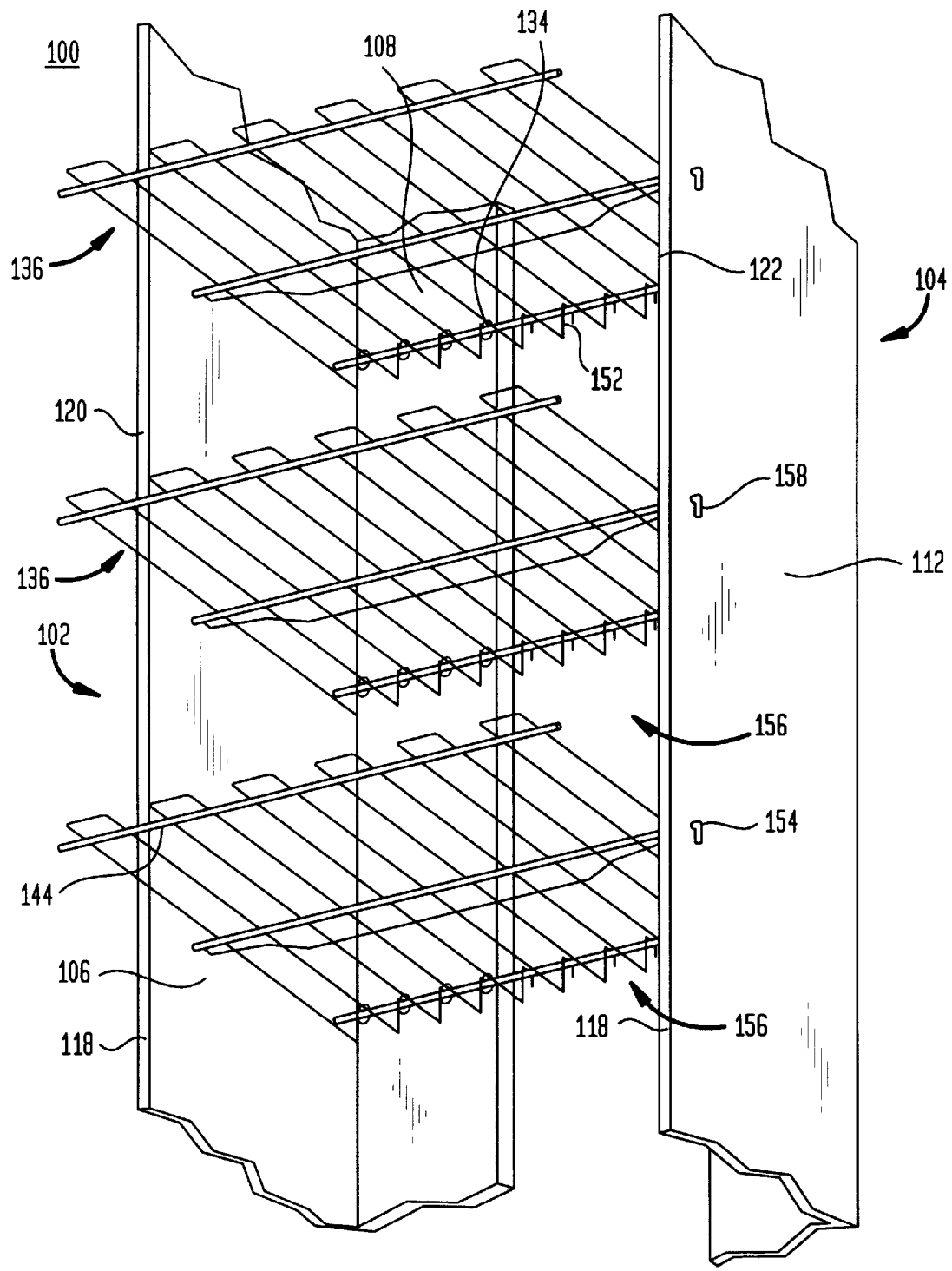
FIG. 12 shows a perspective view of the storage bin assembly shown in FIG. 4A.

FIG. 12 shows a perspective view of a portion of the storage bin assembly shown in FIG. 9. The shelves 136 are preferably spaced apart from one another to provide a plurality of storage slots 156. The storage slots 156 are preferably in substantial vertical alignment with one another. Shelves 136 are secured to first and second support members 102, 104. Each shelf 136 includes rear hooks 152 extending from the rear edge thereof, the rear hooks 152 being secured within openings 134 in the first and second backwall portions 108, 114. Each shelf 136 also includes lateral hooks 154 extending from opposite ends of one of the first support rods 144. The lateral hooks 154 engage openings 158 in the sidewalls 106, 112 of the first and second support members 102, 104, thereby further securing the shelf 136 to the assembly. The forward edge of each shelf preferably extends beyond the front face 118 of storage bin assembly 100. As mentioned above, the front face 118 of the respective first and second supports 102, 104 preferably includes outwardly projecting guide flanges 120, 122. The guide flanges 120, 122 preferably extend away from one another.

Figure 13:
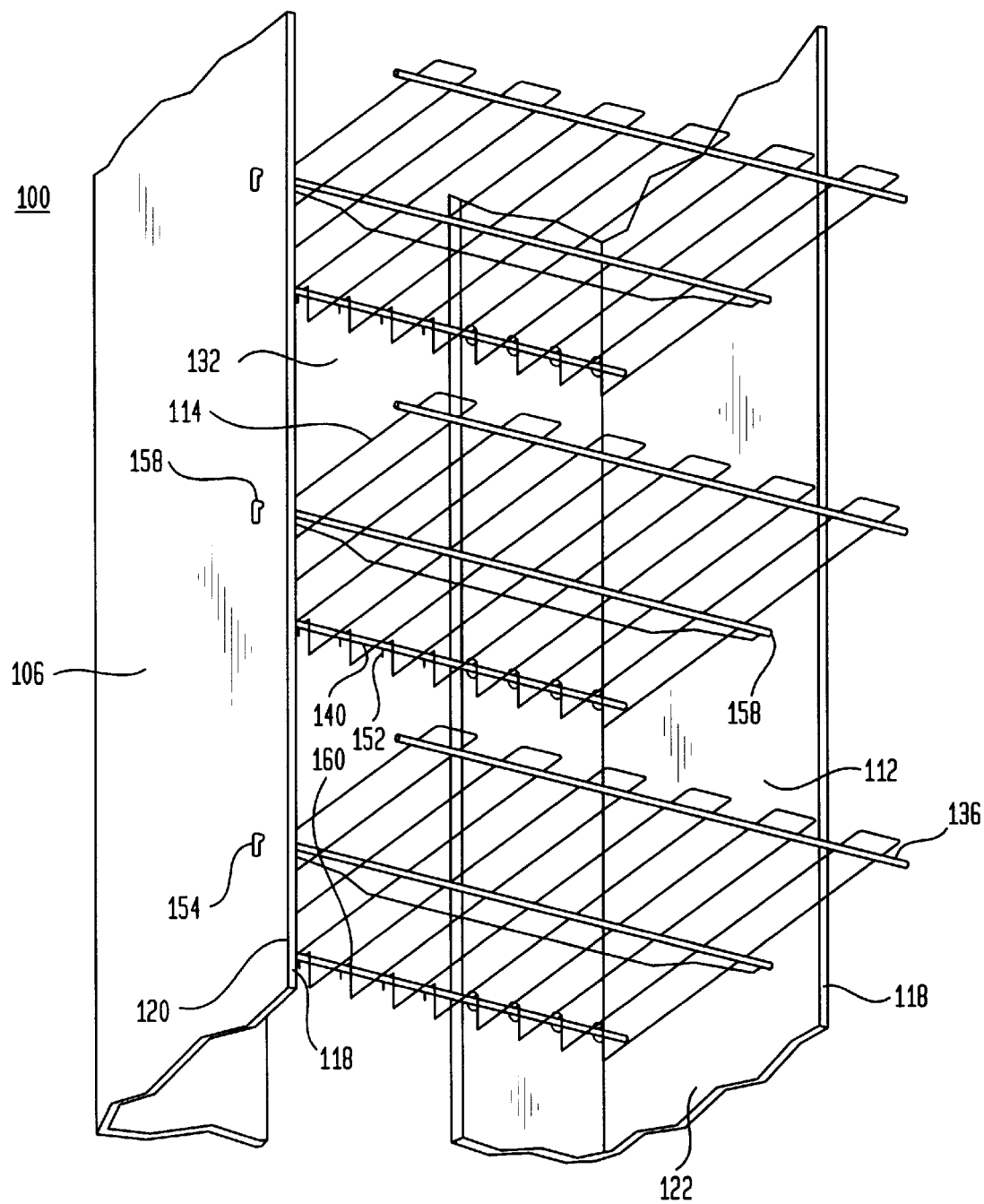
FIG. 13 shows another perspective view of the storage bin assembly shown in FIG. 4A.

Referring to FIG. 13 each shelf 136 preferably includes a rear ledge 160 that extends adjacent the rear edge 140 of the shelf. The rear ledge 160 projects above a top surface of shelf 136 so as to prevent any items stored on the shelf from sliding off the rear edge 140 of the shelf 136 and through gap 132. As shown in FIG. 13, each shelf 136 includes rear hooks 152 secured to the openings 134 in the first and second backwall portions 108,114 and lateral hooks 154 secured to the openings 158 through the first and second sidewalls 106, 112. As mentioned above, front face 118 of storage bin assembly 100 includes outwardly projecting guide flanges 120, 122. Guide flanges 120, 122 extend away from one another and are designed to guide articles being placed atop the shelves 136.

Figure 14:
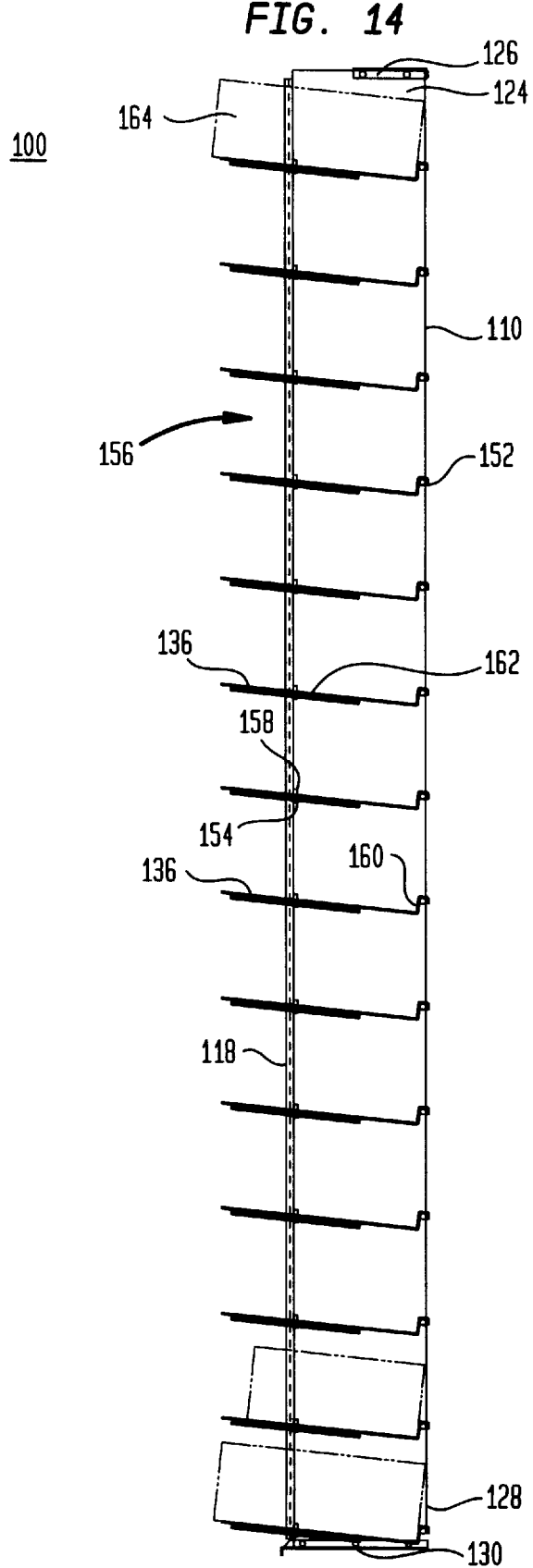
FIG. 14 shows a cross-sectional view of the storage bin assembly of FIG. 9, taken along the line XIV—XIV of FIG. 9.

Referring to FIG. 14, storage bin assembly 100 includes upper plate 126 secured to upper ends 124 of the first and second support members and lower plate 130 secured to lower ends 128 of the first and second support members. As mentioned above, the upper and lower plates 126, 130 preferably enhance the structural rigidity of the assembly. The storage bin assembly 100 also includes a plurality of shelves 136 secured thereto. Each shelf 136 includes rear hooks 152 secured to openings extending through backwall 110 and side hooks 154 extending through openings 158 in the first and second sidewalls. In certain preferred embodiments, the openings 158 in the sidewalls and rear walls are arranged so that the top surfaces 162 of the shelves 136 slope in a downward direction between the front face 118 and backwall 110 of the assembly. As a result, articles 164 stored in the storage slots 156 will be urged by gravity to slide toward the rear ledges 160 of the shelves 136. In the particular embodiment shown in FIG. 14, the overall height of the storage bin assembly is preferably about 10–40 feet and the distance between the backwall 110 and front face 118 is about approximately 10–30 inches. The support members may be made of metal, such as galvanized steel having a size between 10–22 gauge.

Figure 15:
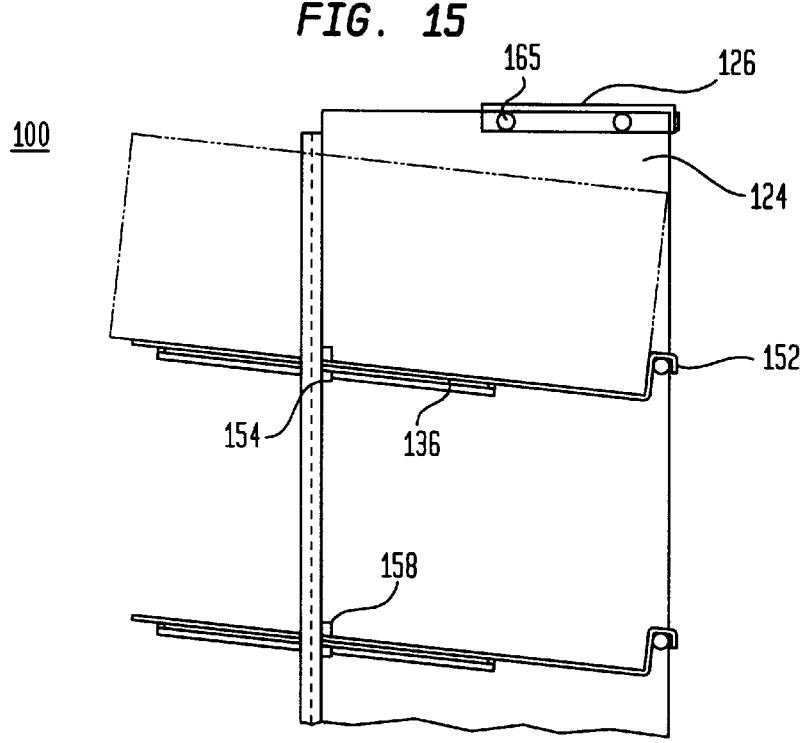
FIG. 15 shows an expanded view of an upper end of the storage bin assembly shown in FIG. 14.

Referring to FIG. 15, upper plate 126 is attached to the upper ends 124 of the first and second support members. The upper plate 126 may be attached using securing elements 166, such as threaded bolts or screws. Each shelf 136 includes rear hooks 152 passing through openings in backwall 110 and side hooks 154 passing through openings 158 in the respective sidewalls. Upper plate 126 may be secured by rivets 165 to the upper ends 124 of the first and second support members.

Figure 16:
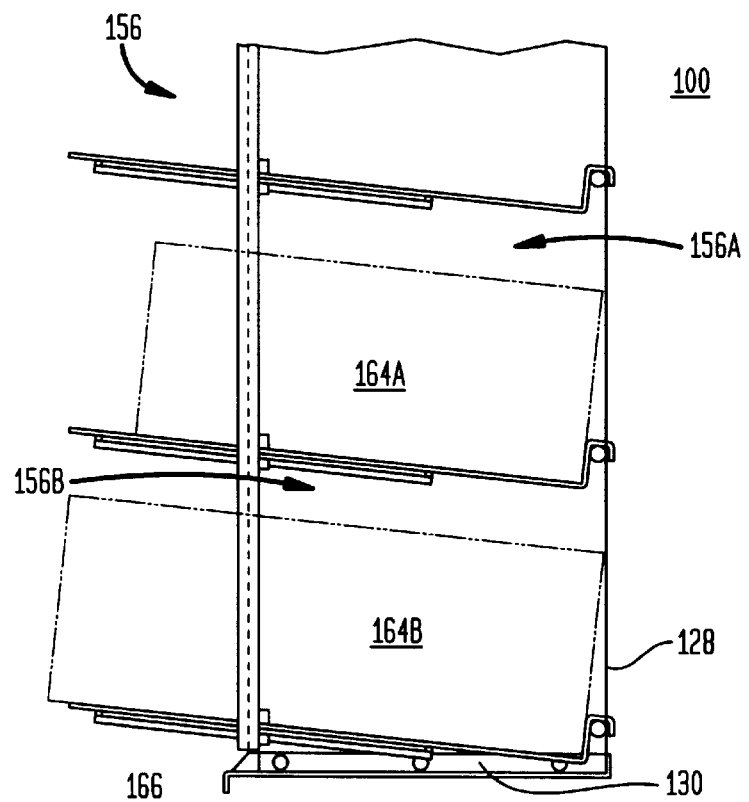
FIG. 16 shows an expanded view of a lower end of the storage bin assembly shown in FIG. 14.

Referring to FIG. 16, a lower plate 130 is attached to the lower ends 128 of first and second support members. Securing elements 166, such as screws or bolts, may be used to secure the lower plate 130 to the lower ends of the first and second support members. The storage slots 156 are adapted for receiving articles having different dimensions. For example, as shown in FIG. 16, a first article 164A having a first dimension is stored in slot 156A, while a second article having a larger dimension is stored in slot 156B. Thus, articles of various sizes may be stored in the assembly.

Figure 17:
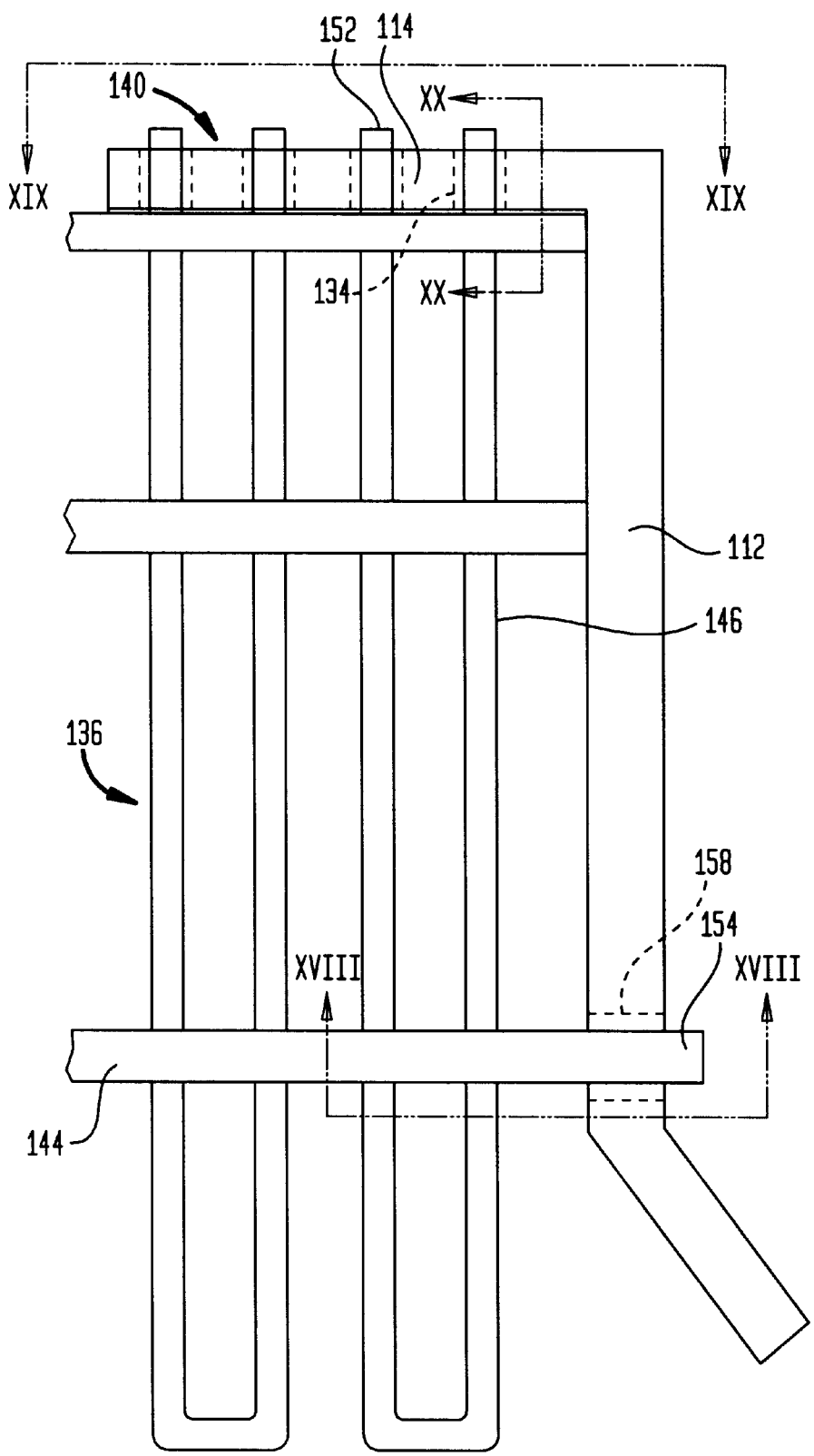
FIG. 17 shows a fragmentary view of the storage assembly shown in FIG. 10.
Figure 18:
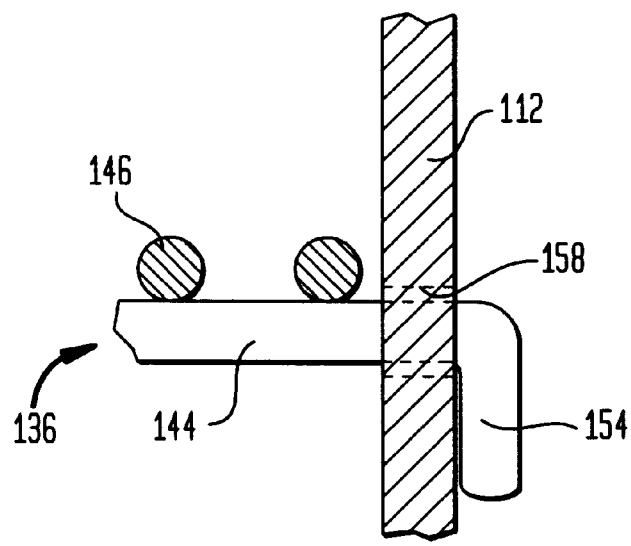
FIG. 18 shows a cross-sectional view of the storage bin assembly of FIG. 17, taken along line XVIII—XVIII of FIG. 17.

Referring to FIG. 17, shelf 136 includes at least one first support rod 144 having lateral or side hooks 154 and second support rods 146 having rear hooks 152 at a rear edge 140 of shelf 136. The lateral hooks 154 pass through, and are secured to, openings 158 in the sidewall 112 of the assembly and the rear hooks 152 pass through, and are secured to, openings 134 in the backwall portion 114 of the assembly. Referring to FIG. 18, side hook 154 passes through the opening 158 in second sidewall 112 so as to secure the shelf 136 to second sidewall. The second support rods 146 of shelf 136 preferably extend in directions that are substantially perpendicular to the first support rods 144.

Figure 19:
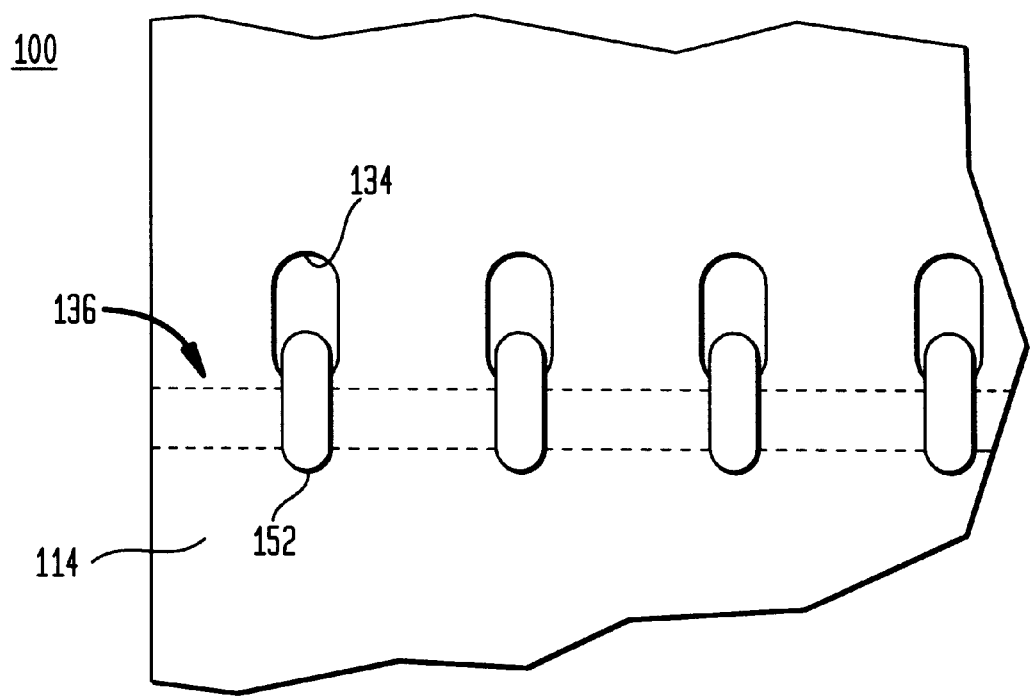
FIG. 19 shows a rear view of the storage bin assembly of FIG. 17 taken along line XIX—XIX of FIG. 17.
Figure 20:
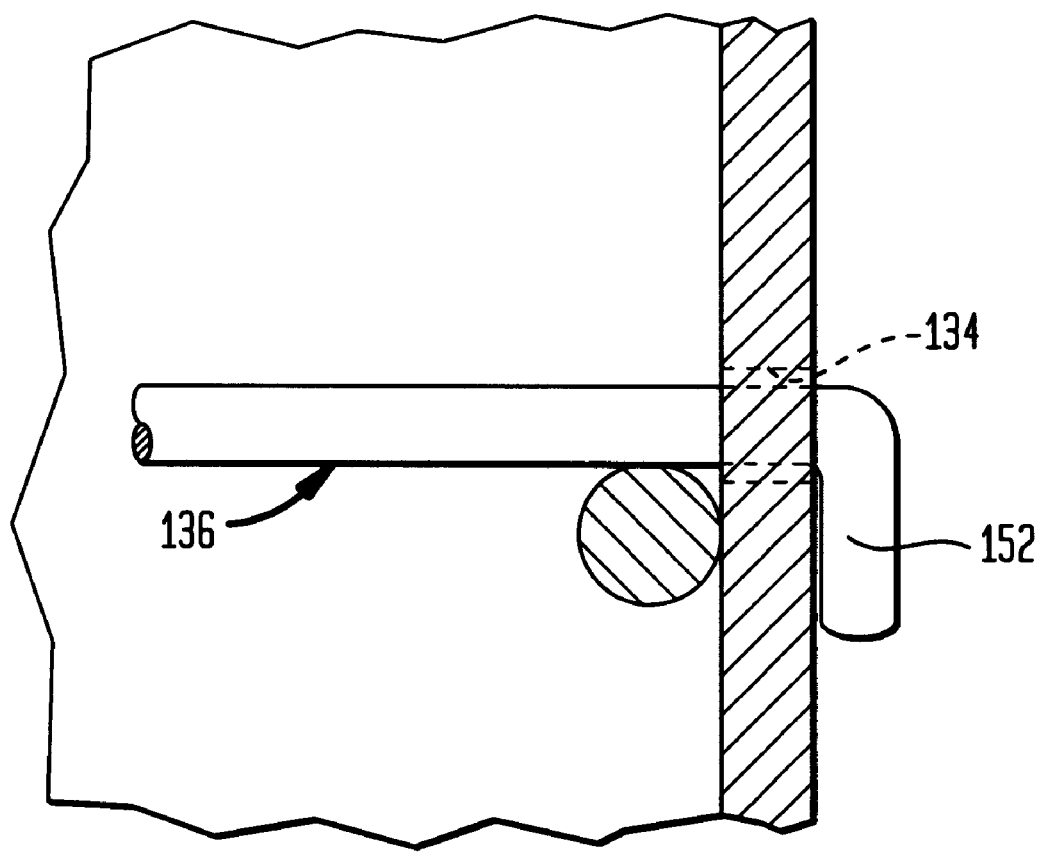
FIG. 20 shows a fragmentary cross-sectional view of the storage bin assembly of FIG. 17, taken along line XX—XX of FIG. 17.

Referring to FIG. 19, shelf includes rear hooks 152 that pass through the openings 134 in the backwall portions 114 so as to secure the rear edge of shelf to the assembly. Referring to FIG. 20, the rear hooks 152 secure the rear edges of shelf 136 to the storage bin assembly, thereby preventing the shelves from becoming detached from the assembly.

Figure 21:
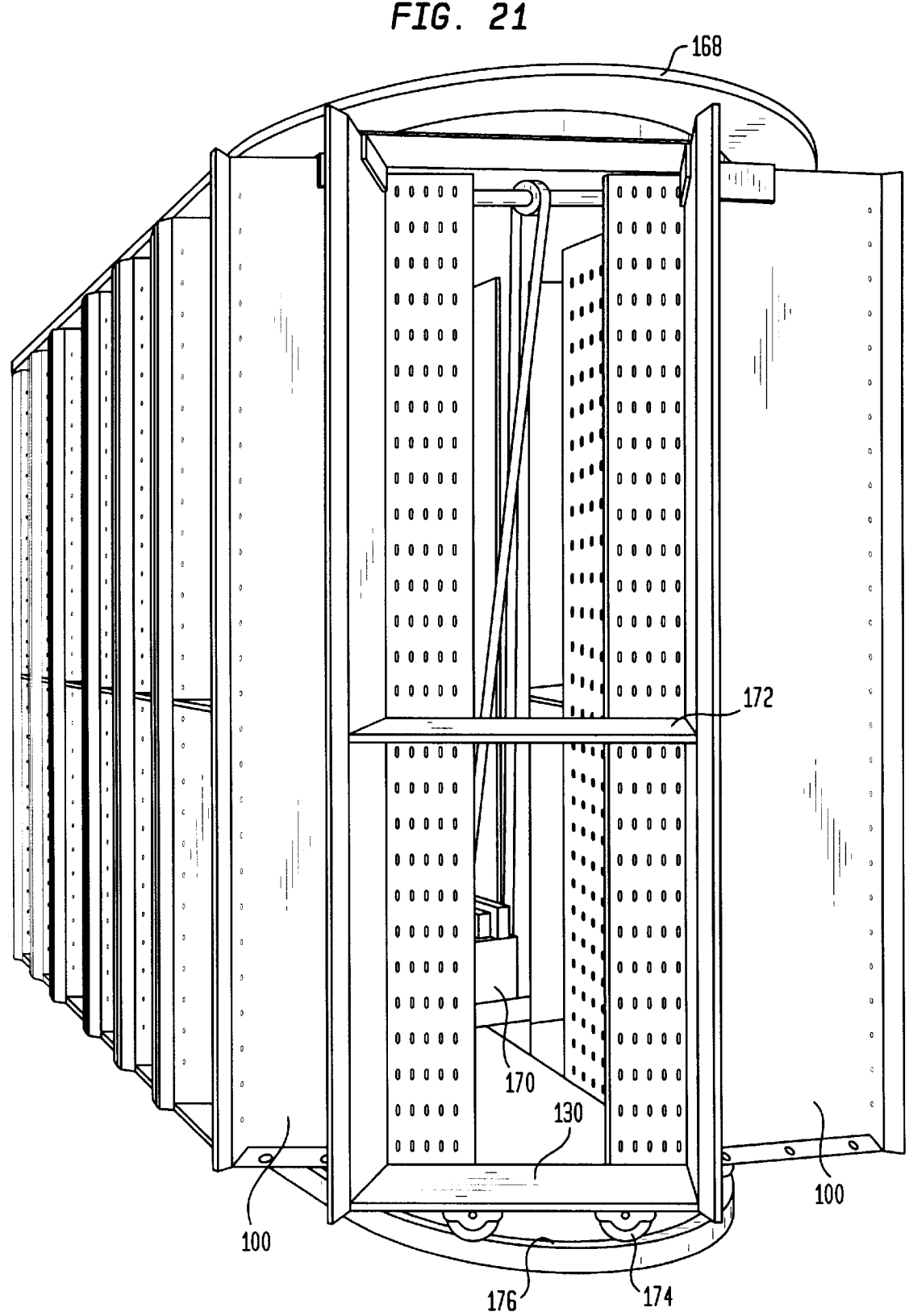
FIG. 21 shows a plurality of the storage bin assemblies of FIG. 5 attached to a movable carousel-type support frame.

Referring to FIG. 21, in certain preferred embodiments, a plurality of the above-described storage bin assemblies 100 may be secured to a movable carousel 168. The carousel may include a drive mechanism 170 for moving the respective storage bin assemblies about the carousel. The carousel may be selectively activated so as to selectively move the assemblies. Each storage bin assembly 100 desirably includes a lower plate and an upper plate secured to the respective lower and upper ends of the support members. In certain preferred embodiments, a horizontal support 172, such as a bar or plate, may extend in a direction that is substantially perpendicular to the support members. The horizontal support 172 enhances the structural rigidity of the assembly. One or more guide wheels 174 may be secured to an underside of lower plate 130 for guiding the storage bin assemblies along a guide track or rail 176.

Figure 22:
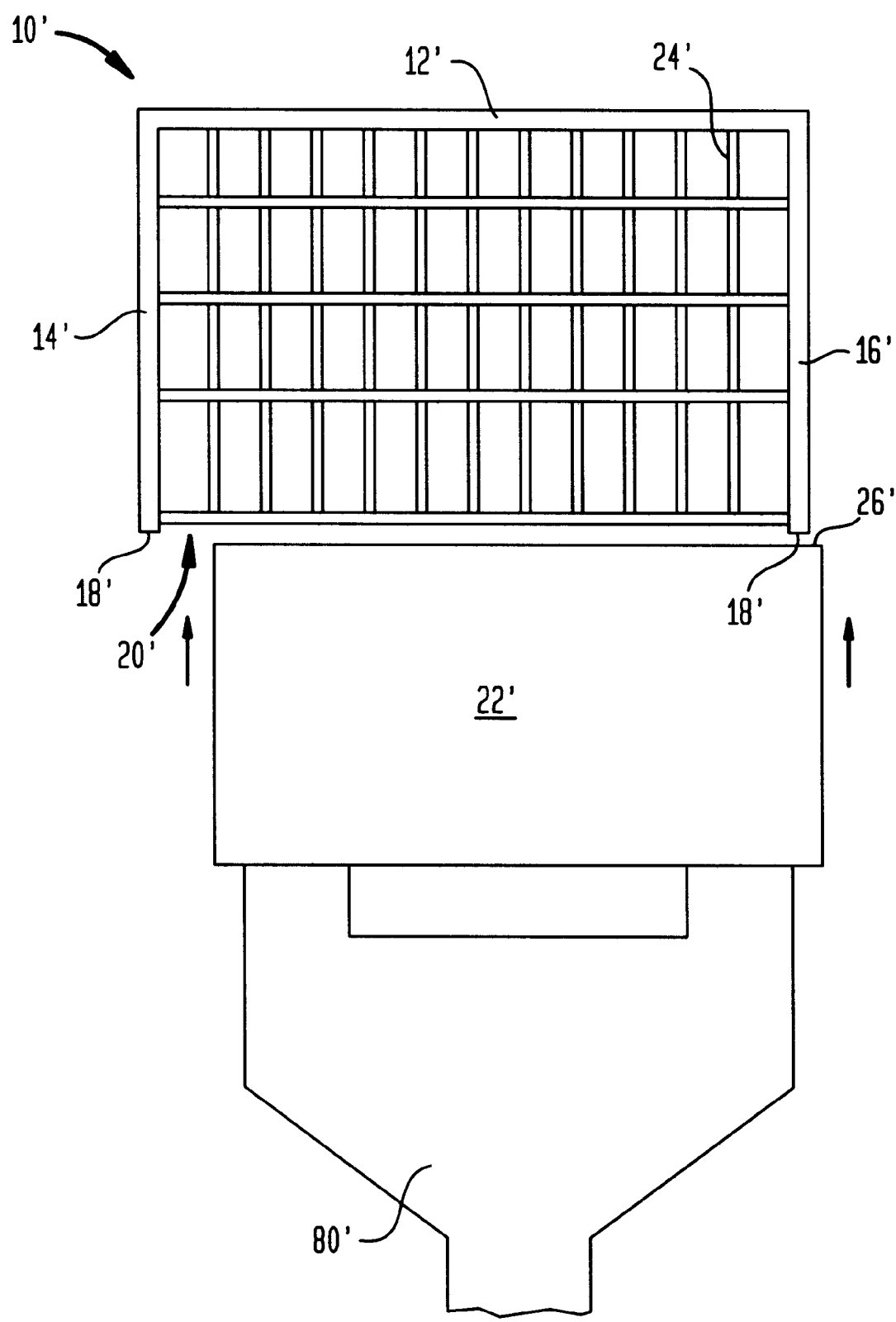
FIG. 22 shows an article being stored in a prior art storage bin.

FIG. 22 shows a prior art storage system including a storage bin 10' having a solid backwall 12' and solid sidewalls 14', 16'. A front face 18' of the storage bin 10' includes an opening 20' for receiving an article 22' to be stored upon a shelf 24'. The front face 18' of bin 10' includes blunt front edges. During an automated storing process, an automated fork lift 80' is used to place the article 22' within the storage bin 10'. However, as can be seen in FIG. 22, an edge 26' of the article 22' will strike the blunt front edge 18' of the second sidewall 16'. As a result, the article 22' will not be properly positioned within the storage bin. In response to these problems, developers of automated storage systems have been required to make the openings 20' of the bins larger than necessary so as to avoid the above-mentioned problem. As a result, a large tolerance must be built into the system. This typically requires that the dimensions of the opening 20' in the front face of the storage bin be significantly larger than the dimensions of the articles 22' being stored. This ultimately reduces the number of bins that may be attached to a frame, reducing the overall capacity of the system.

Figure 23:
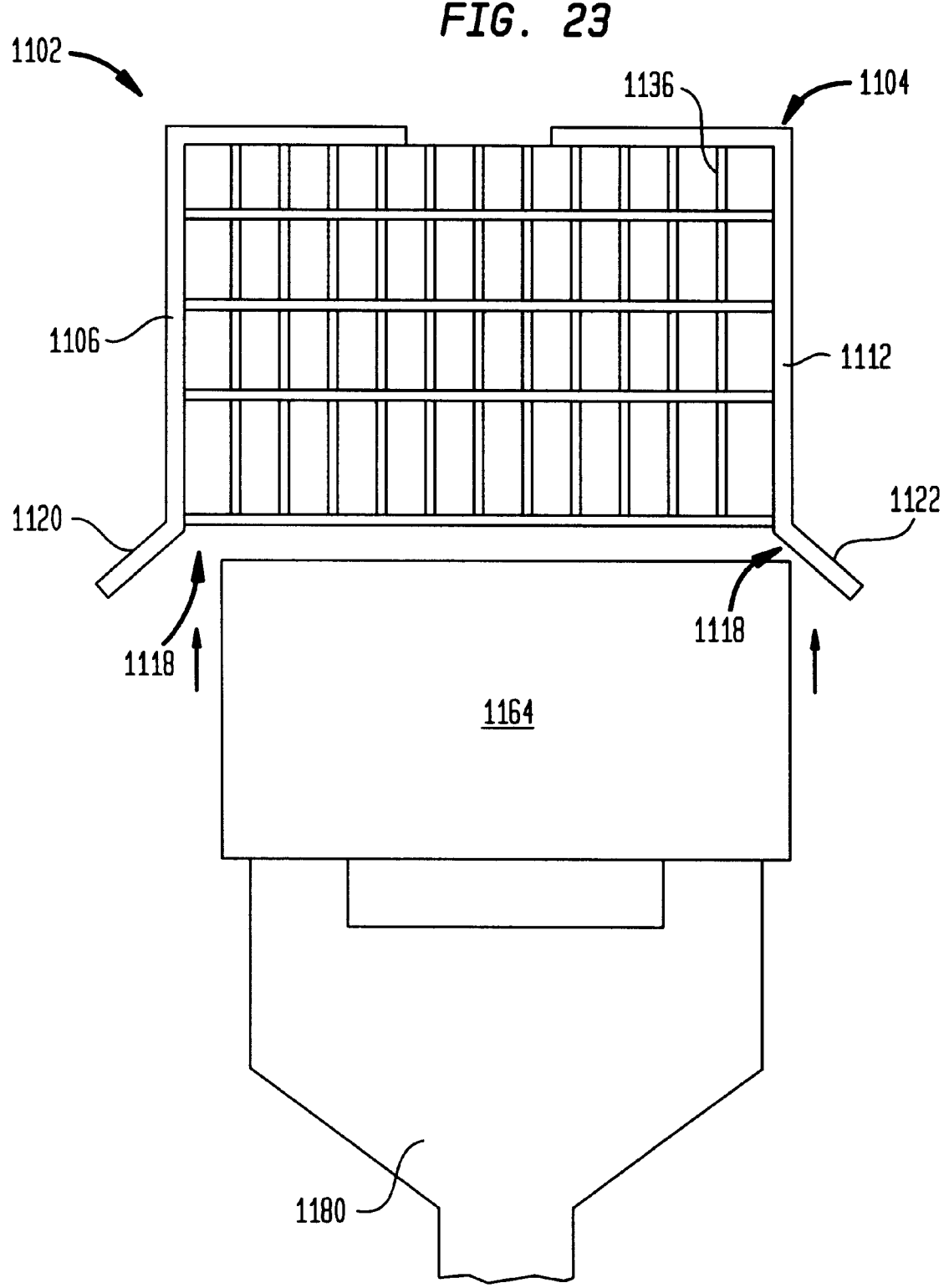
FIG. 23 shows an article being stored in the storage bin assembly of FIG. 4A, in accordance with certain preferred embodiments of the present invention.

FIG. 23 shows a storage bin assembly of the present invention, which avoids the problems shown and described in FIG. 22. The front edges 1118 of the first and second support members 1102, 1104 include outwardly projecting guide flanges 1120, 1122 that extend outwardly beyond the first and second sidewalls 1106, 1112. As a result, if an article 1164 being stored by an automated forklift 1180 is misaligned with the opening of the bin, the guide flanges 1120, 1122 will direct the article 1164 into the bin opening. In the particular embodiment shown in FIG. 23, the guide flange 1122 projecting from the second sidewall 1112 will urge the article to move slightly to the left so as to properly fit within the bin opening. Without the guide flange, the edge of the article being stored would strike a blunt front edge of a sidewall (FIG. 22) and would possibly result in the article being improperly positioned atop the shelf 1136.

Figure 24:
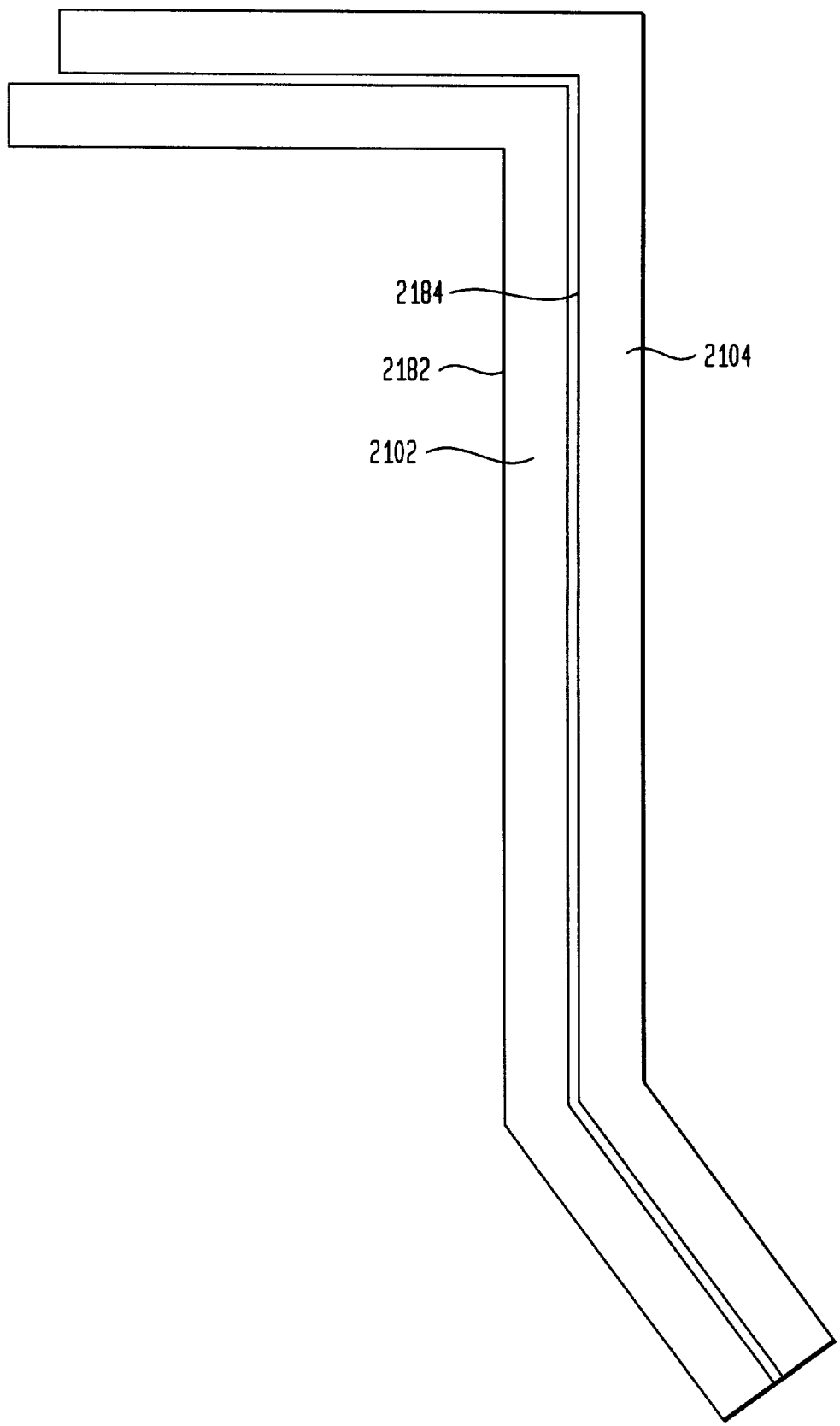
FIG. 24 shows first and second support members nested within one another, in accordance with certain preferred embodiments of the present invention.

FIG. 24 shows a top view of two support members 2102, 2104 in a nested orientation. After the support members are manufactured, the support members are preferably placed in the nested orientation for shipping between the point of manufacture and the point of assembly. The ability to nest the first support member 2102 within the second support member 2104 saves considerable space during shipping, thereby reducing shipping and handling costs. This is a dramatic improvement over the solid storage bin assemblies of the prior art (FIG. 22) which are typically completely assembled before being shipped to the point of installation. In certain preferred embodiments, the support members are universal. In other words, a universal support member may be used as either a first support member, or a second support member. For example, the first support member shown in FIG. 24 will be flipped end over end so that interior surface 2182 of first support member 2102 faces the interior surface 2184 of second support member, with the respective flanges of the members projecting away from one another, as shown in FIG. 23.

Figure 25:
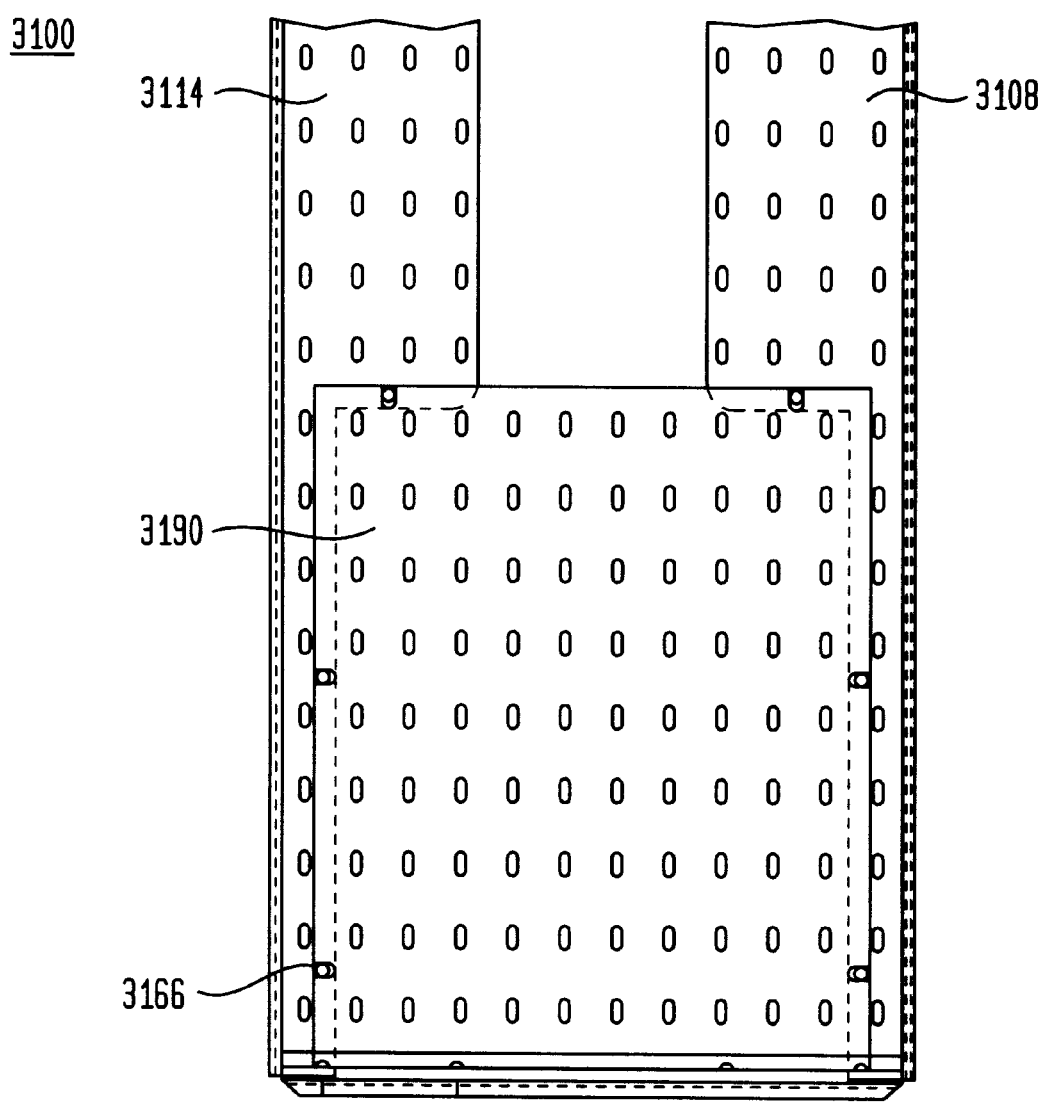
FIG. 25 shows a fragmentary rear view of a storage bin assembly, in accordance with certain preferred embodiments of the present invention.

FIG. 25 shows yet another preferred embodiment of the present invention, whereby an access 3190 is secured to the first and second backwall portions 3108, 3114. The access panel 3190 is preferably secured to the respective backwall portions 3108, 3114 via securing elements 3166, such as threaded bolts or screws. The access panel 3190 may be removed to obtain access to the drive mechanism for the carousel. The access panel can be resecured after any maintenance work has been done on the assembly.

Although the present invention has been described with reference to particular preferred embodiments, it is to be understood that the embodiments are merely illustrative of the principles and applications of the present invention. It is therefore to be understood that numerous modifications may be made to the preferred embodiments, and that other arrangements may be devised, without departing from the spirit and scope of the present invention as defined by the claims.

What is claimed is:

1. A storage bin assembly having first and second sidewalls and a backwall, said assembly comprising:
    a first substantially L-shaped support member made of a metal blank including said first sidewall and a first portion of said backwall, said first backwall portion being integrally connected to said first sidewall;
    a second substantially L-shaped support member made of a metal blank including said second sidewall and a second portion of said backwall, said second backwall portion being integrally connected to said second sidewall; and
    a plurality of shelves secured to said first and second support members, wherein said shelves extend from said backwall and between said first and second sidewalls, and wherein said first and second support members have openings extending through said first and second backwall portions and said first and second sidewalls, said openings being aligned in rows forming a plurality of levels for said shelves, each said shelf being at least partially secured in said openings of one of said rows.

2. The storage bin assembly as claimed in claim 1, wherein said first and second sidewalls confront one another.

3. The storage bin assembly as claimed in claim 1, wherein said first and second backwall portions are spaced apart from one another so as to define a gap therebetween.

4. The storage bin assembly as claimed in claim 1, wherein said first and second sidewalls are substantially parallel with one another.

5. The storage bin assembly as claimed in claim 1, wherein each said first and second support member has an upper end and a lower end.

6. The storage bin assembly as claimed in claim 5, further comprising a top support plate attached to the upper ends of said first and second support members.

7. The storage bin assembly as claimed in claim 5, further comprising a bottom support plate attached to the lower ends of said first and second support members.

8. The storage bin assembly as claimed in claim 1, wherein said first sidewall and said first portion of said backwall form a unitary piece.

9. The storage bin assembly as claimed in claim 1, wherein said second sidewall and said second portion of said backwall form a unitary piece.

10. The storage bin assembly as claimed in claim 1, wherein said first and second sidewalls include front edges extending between upper and lower ends of said assembly, said front edges being remote from said backwall of said assembly.

11. The storage bin assembly as claimed in claim 10, wherein the front edges of said first and second sidewalls include flanges extending away from one another.

12. The storage bin assembly as claimed in claim 11, wherein said flanges extend between the upper and lower ends of said support members.

13. The storage bin assembly as claimed in claim 12, wherein each said shelf includes a front edge, a rear edge and first and second side edges extending between said front and rear edges.

14. The storage bin assembly as claimed in claim 13, wherein each said shelf includes at least one first support rod extending in a direction substantially parallel to the front and rear edges of said shelf, said at least one first support rod having outer ends extending beyond the side edges of said shelf.

15. The storage bin assembly as claimed in claim 14, wherein the first and second sidewalls of said first and second support members include openings for receiving the outer ends of said at least one first support rod.

16. The storage bin assembly as claimed in claim 13, wherein the rear edge of each said shelf includes rear hooks.

17. The storage bin assembly as claimed in claim 16, wherein the first and second backwall portions of said assembly include openings for receiving said rear hooks.

18. The storage bin assembly as claimed in claim 1, wherein said assembly is coupled with a movable carousel-type frame.

19. The storage bin assembly as claimed in claim 1, wherein said shelves include rear hooks secured in openings extending through said first and second backwall portions and lateral hooks secured in openings extending through said sidewalls.

20. A storage bin assembly having first and second sidewalls and a backwall, said assembly comprising:
    a first unitary support made of a metal blank including said first sidewall and a first portion of said backwall, said first backwall portion being integrally connected to said first sidewall;
    a second unitary support made of a metal blank including said second sidewall and a second portion of said backwall, said second backwall portion being integrally connected to said second sidewall;
    an upper support plate attached to upper ends of said first and second unitary supports;
    a lower support plate attached to lower ends of said first and second unitary supports; and a plurality of shelves secured to said first and second supports having hooks extending through openings in said backwall and said sidewalls.

21. The storage bin assembly as claimed in claim 20, wherein said first and second sidewalls extend in directions substantially parallel to one another.

22. The storage bin assembly as claimed in claim 20, wherein the first and second portions of said backwall extend in a direction substantially perpendicular to said sidewalls.

23. The storage bin assembly as claimed in claim 20, wherein said first and second backwall portions are spaced apart from one another so as to define a gap in said backwall.

24. The storage bin assembly as claimed in claim 20, wherein each said unitary support has a plurality of openings extending therethrough.

25. The storage bin assembly as claimed in claim 20, wherein the first and second sidewalls define a front face extending between the upper and lower another. edges of said unitary supports, said front face being remote from said backwall of said assembly.

26. The storage bin assembly as claimed 25, wherein the front face of said first and second sidewalls include flanges extending away from one another.

27. The storage bin assembly as claimed in claim 26, wherein said flanges extend between the upper and lower ends of said unitary support members.

28. The storage bin assembly as claimed in claim 20, wherein said shelves extend from said backwall and between said first and second sidewalls.

29. The storage bin assembly as claimed in claim 28, wherein each said shelf includes a front edge, a rear edge and first and second side edges extending between said front and rear edges.

30. The storage bin assembly as claimed in claim 29, wherein each said shelf includes at least one first support rod extending in a direction substantially parallel to the front and rear edges of said shelf, said at least one first support rod having outer ends extending beyond the first and second lateral edges of said shelf.

31. The storage bin assembly as claimed in claim 30, wherein the outer ends of said at least one first support being secured to the openings of said unitary support members.

32. The storage bin assembly as claimed in claim 29, wherein said first and second backwall portions include openings.

33. The storage bin assembly as claimed in claim 32, wherein the rear edge of each said shelf includes hooks securable in the openings of said first and second backwall portions.

34. A storage bin assembly having first and second sidewalls, a backwall and an opening remote from said backwall, said assembly comprising:

a first substantially L-shaped support made of a metal blank having an upper end and a lower end, said first support including said first sidewall and a first portion of said backwall integrally connected together;

a second substantially L-shaped support made of a metal blank having an upper end and a lower end, said second support including said second sidewall and a second portion of said backwall integrally connected together;

said first and second sidewalls including front edges remote from said backwall and extending between the upper and lower edges of said supports, the front edges of said first and second sidewalls including outwardly extending flanges extending away from one another, and a plurality of shelves secured to said first and second support members having hooks extending through openings in said backwall and said sidewalls.

35. The storage bin assembly as claimed in claim 34, further comprising:

an upper support plate secured to the upper ends of said first and second support members; and a lower support plate secured to the lower ends of said first and second support members.

36. A carousel-type storage system comprising:

a frame and at least one frame, storage bin assembly coupled to and supported by said frame each said at least one storage bin assembly comprising:

a first substantially L-shaped support member made of a metal blank including a first sidewall and a first portion of a backwall, said first backwall portion being integrally connected to said first sidewall, a second substantially L-shaped support member made of a metal blank including a second sidewall and a second portion of said backwall, said second backwall portion being integrally connected to said second sidewall, and a plurality of shelves secured to said first and second support members, wherein each said shelf includes rear hooks secured in openings extending through said first and second backwall portions and lateral hooks secured in openings extending through said sidewalls.

* * * * *

UNITED STATES PATENT AND TRADEMARK OFFICE
CERTIFICATE OF CORRECTION

PATENT NO.     : 6,431,376 B1                                                Page 1 of 1
DATED          : August 13, 2002
INVENTOR(S)    : Joseph J. Wisniewski It is certified that error appears in the above-identified patent and that said Letters Patent is hereby corrected as shown below:

<u>Column 2,</u>
Line 40, delete "to".

<u>Column 7,</u>
Line 59, after "shelf" insert -- . --.

<u>Column 11,</u>
Line 60, "a s" should read -- as --.
Line 60, "i n" should read -- in --.

<u>Column 13,</u>
Line 18, "the" should read -- said --.
Line 19, delete "another".
Line 22, after "claimed" insert -- in claim --.

<u>Column 14,</u>
Line 31, delete "frame".
Line 32, after "frame" insert -- , --.

Signed and Sealed this

Eighteenth Day of February, 2003

JAMES E. ROGAN
*Director of the United States Patent and Trademark Office*